US010934918B1

(12) United States Patent
Goffe et al.

(10) Patent No.: US 10,934,918 B1
(45) Date of Patent: Mar. 2, 2021

(54) COMBINED UREA HYDROLYSIS AND SELECTIVE CATALYTIC REDUCTION FOR EMISSIONS CONTROL

(71) Applicant: PACCAR Inc, Bellevue, WA (US)

(72) Inventors: Randal A. Goffe, Everett, WA (US); Jacob A. Wall, Sedro-Woolley, WA (US)

(73) Assignee: PACCAR INC, Bellevue, WA (US)

( * ) Notice: Subject to any disclaimer, the term of this patent is extended or adjusted under 35 U.S.C. 154(b) by 0 days.

(21) Appl. No.: 16/601,348

(22) Filed: Oct. 14, 2019

(51) Int. Cl.
F01N 3/20 (2006.01)
B01J 29/76 (2006.01)
B01D 53/94 (2006.01)
F01N 13/00 (2010.01)

(52) U.S. Cl.
CPC ......... *F01N 3/208* (2013.01); *B01D 53/9418* (2013.01); *B01D 53/9427* (2013.01); *B01D 53/9495* (2013.01); *B01J 29/76* (2013.01); *B01D 2251/2067* (2013.01); *F01N 13/002* (2013.01); *F01N 2610/02* (2013.01); *F01N 2610/1406* (2013.01)

(58) Field of Classification Search
CPC .................. F01N 3/208; F01N 13/002; F01N 2610/1406; F01N 2610/02; B01D 53/9418; B01D 53/9427
USPC .................................... 422/169; 60/285, 296
See application file for complete search history.

(56) References Cited

U.S. PATENT DOCUMENTS

| 858,904 A | 7/1907 | Ostwald |
| 3,730,691 A | 5/1973 | Lang et al. |
| 4,711,871 A | 12/1987 | Wachs et al. |
| 4,929,581 A | 5/1990 | Steinwandel et al. |
| 4,983,274 A | 1/1991 | Chen et al. |
| 5,149,512 A | 9/1992 | Li et al. |
| 6,407,032 B1 | 6/2002 | Labarge et al. |
| 6,475,944 B1 | 11/2002 | Yang et al. |
| 6,826,906 B2 | 12/2004 | Kakwani et al. |

(Continued)

FOREIGN PATENT DOCUMENTS

| CN | 103866343 B | 6/2014 |
| CN | 105363497 A | 3/2016 |

(Continued)

OTHER PUBLICATIONS

Shwan et al., "Solid-State Ion-Exchange of Copper into Zeolites Facilitated by Ammonia at Low Temperature," *ACS Catal.* 5, pp. 16-19, 2015. (4 pages).

(Continued)

*Primary Examiner* — Tom P Duong
(74) *Attorney, Agent, or Firm* — Seed IP Law Group LLP

(57) ABSTRACT

The present disclosure describes a catalytic aftertreatment system that includes a dosing compartment including a doser configured to introduce a diesel exhaust fluid (DEF) including urea into a diesel exhaust; a mixing chamber subsequent to the doser configured to mix the DEF with the diesel exhaust, the mixing chamber including an optional static metallic mixer, and a catalyst substrate including a combined urea hydrolysis-selective catalytic reduction binary catalyst coated thereon; and a SCR unit subsequent to the mixing chamber unit, including an SCR catalyst configured to facilitate reduction of nitrogen oxide (NOx) in the diesel exhaust with $NH_3$.

20 Claims, 16 Drawing Sheets

(56) References Cited

U.S. PATENT DOCUMENTS

| | | |
|---|---|---|
| 7,078,004 B2 | 7/2006 | Voss et al. |
| 7,229,597 B2 | 6/2007 | Patchett et al. |
| 7,509,799 B2 | 3/2009 | Amou et al. |
| 7,632,775 B2 | 12/2009 | Zhou et al. |
| 7,902,107 B2 | 3/2011 | Patchett et al. |
| 7,998,423 B2 | 8/2011 | Boorse et al. |
| 8,017,097 B1 | 9/2011 | Southward et al. |
| 8,017,543 B2 | 9/2011 | Andy et al. |
| 8,119,088 B2 | 2/2012 | Boorse et al. |
| 8,359,832 B2 | 1/2013 | Yi et al. |
| 8,388,920 B2 | 3/2013 | Botte |
| 8,501,132 B2 | 8/2013 | Fu et al. |
| 8,568,675 B2 | 10/2013 | Deeba et al. |
| 8,667,785 B2 | 3/2014 | Blakeman et al. |
| 8,679,434 B1 | 3/2014 | Li et al. |
| 8,748,333 B2 | 6/2014 | Nemeth et al. |
| 8,828,900 B2 | 9/2014 | Takagi et al. |
| 8,989,637 B2 | 3/2015 | Yoshii |
| 9,005,559 B2 | 4/2015 | Sumiya et al. |
| 9,034,269 B2 | 5/2015 | Hilgendorff et al. |
| 9,186,654 B2 | 11/2015 | Qi et al. |
| 9,737,877 B2 | 8/2017 | Goffe |
| 9,757,691 B2 | 9/2017 | Goffe |
| 9,764,287 B2 | 9/2017 | Goffe |
| 10,188,986 B2 | 1/2019 | Goffe |
| 2002/0049137 A1 | 4/2002 | Morikawa et al. |
| 2002/0054844 A1 | 5/2002 | Pfeifer et al. |
| 2002/0132724 A1 | 9/2002 | Labarge et al. |
| 2004/0206069 A1* | 10/2004 | Tumati ............... F01N 3/105 60/285 |
| 2005/0013756 A1 | 1/2005 | Amou et al. |
| 2006/0049063 A1 | 3/2006 | Murphy et al. |
| 2006/0057046 A1 | 3/2006 | Punke et al. |
| 2006/0257303 A1 | 11/2006 | Telford |
| 2008/0314027 A1 | 12/2008 | Barber et al. |
| 2009/0173063 A1 | 7/2009 | Boorse et al. |
| 2009/0205324 A1 | 8/2009 | Girard et al. |
| 2009/0214397 A1 | 8/2009 | Shirono et al. |
| 2010/0139152 A1 | 6/2010 | Hucul et al. |
| 2010/0146948 A1 | 6/2010 | DaCosta et al. |
| 2010/0146950 A1 | 6/2010 | Hayashi et al. |
| 2010/0172828 A1 | 7/2010 | Althoff et al. |
| 2010/0180580 A1 | 7/2010 | Boorse et al. |
| 2010/0247407 A1 | 9/2010 | Larcher et al. |
| 2011/0030346 A1 | 2/2011 | Neubauer et al. |
| 2011/0142737 A1 | 6/2011 | Seyler et al. |
| 2011/0155643 A1 | 6/2011 | Tov et al. |
| 2011/0250114 A1 | 10/2011 | Augustine et al. |
| 2011/0293941 A1 | 12/2011 | Chaumonnot et al. |
| 2011/0302909 A1 | 12/2011 | Botte |
| 2012/0058034 A1 | 3/2012 | Ogunwumi et al. |
| 2012/0121486 A1 | 5/2012 | Collier et al. |
| 2012/0175247 A1 | 7/2012 | Darrel |
| 2012/0230881 A1 | 9/2012 | Boger et al. |
| 2012/0247092 A1 | 10/2012 | Boorse |
| 2013/0102819 A1 | 4/2013 | Szesni et al. |
| 2013/0121902 A1 | 5/2013 | Adelmann et al. |
| 2013/0158138 A1 | 6/2013 | Jothimurugesan et al. |
| 2013/0336865 A1 | 12/2013 | Brisley et al. |
| 2014/0041366 A1 | 2/2014 | Seyler et al. |
| 2014/0044627 A1 | 2/2014 | Siani et al. |
| 2014/0061099 A1 | 3/2014 | Hussain et al. |
| 2014/0127100 A1* | 5/2014 | Gerhart ............... C01C 1/04 423/212 |
| 2014/0140909 A1 | 5/2014 | Qi et al. |
| 2014/0141963 A1 | 5/2014 | Jones et al. |
| 2014/0193746 A1 | 7/2014 | Cerri et al. |
| 2014/0227155 A1 | 8/2014 | Phillips et al. |
| 2014/0234190 A1 | 8/2014 | McKenna |
| 2015/0000737 A1 | 1/2015 | Miyake et al. |
| 2015/0017075 A1 | 1/2015 | Jinbo et al. |
| 2015/0017083 A1 | 1/2015 | Maunula |
| 2015/0037233 A1 | 2/2015 | Fedeyko et al. |
| 2015/0060472 A1 | 3/2015 | Most et al. |
| 2015/0114882 A1 | 4/2015 | Nagayasu et al. |
| 2015/0209766 A1 | 7/2015 | Xavier et al. |
| 2015/0360212 A1 | 12/2015 | Chandler et al. |
| 2016/0040576 A1 | 2/2016 | Chandler et al. |
| 2016/0045868 A1 | 2/2016 | Sonntag et al. |
| 2016/0074809 A1 | 3/2016 | Goffe |
| 2016/0074839 A1 | 3/2016 | Goffe |
| 2016/0076425 A1* | 3/2016 | Goffe ............... B01F 5/0451 60/295 |
| 2016/0136617 A1 | 5/2016 | Nazapoor et al. |
| 2016/0214086 A1 | 7/2016 | Ano et al. |
| 2016/0303555 A1 | 10/2016 | Park et al. |
| 2016/0339389 A1 | 11/2016 | Hoke et al. |
| 2016/0346765 A1 | 12/2016 | Nazarpoor et al. |
| 2017/0128881 A1 | 5/2017 | Goffe |
| 2017/0128882 A1* | 5/2017 | Goffe ............... B01J 21/066 |
| 2017/0128883 A1* | 5/2017 | Goffe ............... B01J 21/066 |
| 2017/0128884 A1 | 5/2017 | Goffe |
| 2017/0128885 A1* | 5/2017 | Goffe ............... F01N 3/2066 |
| 2017/0128913 A1 | 5/2017 | Goffe |
| 2017/0284257 A1* | 10/2017 | Omiya ............... B01D 53/944 |
| 2017/0320014 A1 | 11/2017 | Hanson |
| 2018/0345217 A1* | 12/2018 | Goffe ............... B01J 29/7615 |

FOREIGN PATENT DOCUMENTS

| | | |
|---|---|---|
| CZ | 293 108 B6 | 2/2004 |
| DE | 4203807 A1 | 8/1993 |
| EP | 1945356 B1 | 9/2012 |
| EP | 3370866 A1 | 9/2018 |
| GB | 2504024 A | 1/2014 |
| GB | 2504024 B | 3/2014 |
| WO | 2017/079598 A1 | 5/2000 |
| WO | 2004/022229 A1 | 3/2004 |
| WO | 2008/094889 A1 | 8/2008 |
| WO | 2009/050323 A1 | 4/2009 |
| WO | 2009/118195 A1 | 10/2009 |
| WO | 2012/059144 A1 | 5/2012 |
| WO | 2013/121112 A1 | 8/2013 |
| WO | 2014/027207 A1 | 2/2014 |
| WO | 2015/060472 A1 | 4/2015 |
| WO | 2017/085646 A1 | 5/2017 |

OTHER PUBLICATIONS

Carvahlo et al., "Design of nanocomposites with cobalt encapsulated in the zeolite micropores for selective synthesis of isoparaffins in Fischer-Tropsch reaction," *Catal. Sci. Technol.* 2017(7), Sep. 2017, pp. 5019-5027. (9 pages).

Chu et al., "Isomorphous Substitution in Zeolite Frameworks. 1. Acidity of Surface Hydroxis in [B]-, [Fe]-, [Ga]-, and [Al]-ZSM-5," *J.Phys. Chem* 1985(89), Dec. 1984, pp. 1569-1571. (3 pages).

Luo et al., "Facile synthesis of zeolite-encapsulated iron oxide nanoparticles as superior catalysts for phenol oxidation," *RSC Adv.* 2015(5), Feb. 2015, pp. 29509-29512. (4 pages).

Otto et al., "Synthetic strategies for the encapsulation of nanoparticles of Ni, Co, and Fe oxides within crystalline microporous aluminosilicates," *Microporous and Mesoporous Materials* 279(2018), Apr. 2018, pp. 10-23. (14 pages).

Xu et al., "Encapsulation of Metal Nanoparticle Catalysts Within Mesoporous Zeolites and Their Enhanced Catalytic Performances: A Review," *Front Chem.* 6(550), Nov. 2018, 54 pages.

Bernhard et al., "Catalytic urea hydrolysis in the selective catalytic reduction of $NO_x$: catalyst screening and kinetics on anatase $TiO_2$ and $ZrO_2$," *Catal. Sci. Technol.* 3, 2013, pp. 942-951. (11 pages).

Birkhold et al., "Modeling and simulation of the injection of urea-water-solution for automotive SCR $DeNO_x$-systems," *Applied Catalysis B: Environmental* 70, 2007, pp. 119-127. (9 pages).

Borodianska et al., "Nanoblast synthesis and SPS of nanostructured oxides for SOFC," *J. Electroceram* 22, 2009, pp. 47-54. (8 pages).

Conway et al., "Demonstration of SCR on a Diesel Particulate Filter System on a Heavy Duty Application," SAE Technical Paper No. 2015-01-1033, Apr. 14, 2015, abstract, 2 pages.

Devarakonda et al., "Technical Challenges in the Integration of DPF and SCR Aftertreatment on a Single Substrate—Review from a

(56) References Cited

OTHER PUBLICATIONS

Systems and Modeling Perspective," DOE Cross-Cut Workshop, Dearborn, Michigan, Apr. 28-30, 2009, 22 pages.
Devarakonda et al., "Technical Challenges in the Integration of PDF and SCR Aftertreatment—Review from a Systems and Modeling Perspective," DOE Cross-Cut Workshop, Dearborn, Michigan, Apr. 28-30, 2009, Abstract.
Dong et al., "Effect of Urea Thermal Decomposition on Diesel $NO_x$-SCR Aftertreatment Systems," SAE Technical Paper No. 2008-1-1544, Abstract.
Geisselmann, "Future Aftertreatment Concepts for Heavy Duty Application," SAE 2014 Heavy-Duty Diesel Emissions Control Symposium, Event Guide, Gothenburg, Sweden, Sep. 17-18, 2014, Abstract. (2 pages).
Goffe et al., "Electrocatalytic oxidation of hydrocarbons on a stabilized-zirconia electrolyte employing gold or platinum electrodes," *Journal of Applied Electrochemistry* 11, 1981, pp. 447-452. (6 pages).
Johannessen, "3rd Generation SCR System Using Solid Ammonia Storage and Direct Gas Dosing:—Expanding the SCR window for RDE," US DoE DEER Conference, 2012, 23 pages.
Koebel et al., "Thermal and Hydrolytic Decomposition of Urea for Automotive Selective Catalytic Reduction Systems: Thermochemical and Practical Aspects," *Ind. Eng. Chem. Res*, 42, 2003, pp. 2093-2100. (8 pages).
Köster et al., "Regeneration of Hemofiltrate by Anodic Oxidation of Urea," Artificial Organs 7(2), 1983, pp. 163-168. (6 pages).
Kröcher, "Aspects of Catalyst Development for Mobile Urea-SCR Systems—From Vanadia-Titania Catalysts to Metal-Exchanged Zeolites," *Past and Present in DeNO_x Catalysis*, Elsevier B.V., 2007, pp. 261-289. (29 pages).
Kwak et al., "Effects of hydrothermal aging on $NH_3$-SCR reaction over Cu/zeolites," *Journal of Catalysis* 287, 2012, pp. 203-209. (7 pages).
Kwak et al., "Excellent activity and selectivity of Cu-SSZ-13 in the selective catalytic reduction of NOx with NH3," Journal of Catalysis 275, 2010, pp. 187-190. (4 pages).
Neylon et al., "Bifunctional Catalysts for the Selective Catalytic Reduction of NO by Hydrocarbons," Proceedings, 9th Diesel Emissions Reduction Conference, Newport, Rhode Island, Aug. 24-28, 2003, 5 pages.
PACCAR Inc., "Engine Aftertreatment Systems: Operator's Manual," Y53-1090C, 2011, 44 pages.
Patzer II et al., "Urea oxidation kinetics via cyclic voltammetry: Application to regenerative hemodialysis," *Bioelectrochemistry and Bioenergetics* 22, 1989, pp. 341-355, Dec. 1989. (13 pages).
Patzer II et al., "Voltage Polarity Relay—Optimal Control of Electrochemical Urea Oxidation," IEEE Transactions on Biomedical Engineering 38(11), pp. 157-162, Nov. 1991. (6 pages).
Piazzesi et al., "Isocyanic acid hydrolysis over Fe-ZSM5 in urea-SCR," *Catalysis Communications* 7, 2006, pp. 600-603. (4 pages).
Rappé et al., "Combination & Integration of DPF-SCR Aftertreatment," Pacific Northwest National Laboratory, DEER 2011, 2011, 18 pages.
Rappé et al., "Combination & Integration of DPF-SCR Aftertreatment," Pacific Northwest National Laboratory, DEER 2012, 2012, 34 pages.
Rappé et al., "Combination and Integration of DPF-SCR Aftertreatment Technologies," Pacific Northwest National Laboratory, Annual Merit Review and Peer Evaluation, May 11, 2011, 24 pages.
Rappé et al., "Combination and Integration of DPF-SCR Aftertreatment Technologies," Pacific Northwest National Laboratory, DOE Merit Review, Jun. 9, 2010, 16 page.
Rappé et al., "II.B.12 Combination and Integration of DPF-SCR After-Treatment," Pacific Northwest National Laboratory, Advanced Combustion Engine R&D, FY 2011 Annual Report, pp. 227-230. (4 pages).
Rappé et al., "III.6 Integration of DPF & SCR Technologies for Combined Soot and $NO_x$ After-Treatment," Pacific Northwest National Laboratory, Advanced Combustion Engine R&D, FY 2014 Annual Progress Report, pp. III-30-III-33. (4 pages).
Rappé "Combination and Integration of DPF—SCR Aftertreatment Technologies," Pacific Northwest National Laboratory, Annual Merit Review and Peer Evaluation, May 16, 2012, 24 pages.
Shoeib et al., "Electroless Nickel Coatings on Glass Substrate: Physical and Electrochemical Properties," steel-grips.com, 2013, 4 pages.
Storey et al., "Characterization of Urea Decomposition Products in Selective Catalytic Reduction Catalyst Systems," 2 pages.
Yao et al., "Anodic Oxidation of Urea and an Electrochemical Approach to De-ureation," *Nature* 241, pp. 471-472, Feb. 16, 1973. (2 pages).
Ye et al., "Activity, propene poisoning resistance and hydrothermal stability of copper exchanged chabazite-like zeolite catalysts for SCR of NO with ammonia in comparison to Cu/ZSM-5," *Applied Catalysis A: General* 427-428(2012), 2012, pp. 24-34. (11 pages).
Yim et al., "Decomposition of Urea into NH3 for the SCR Process," Ind. Eng. Chem. Res. 43, 2004, pp. 4856-4863. (8 pages).
Zueco et al., "Urea SCR Systems in Focus: New Challenges in the Development of Exhaust Systems," *MTZ worldwide* 68(9), Sep. 2007, pp. 16-18. (3 pages).

* cited by examiner

COMBINED UREA HYDROLYSIS AND SELECTIVE CATALYTIC REDUCTION FOR EMISSIONS CONTROL

BACKGROUND

Although diesel engines are known to be more economical to run than spark-ignited engines, diesel engines inherently suffer disadvantages in the area of emissions. For example, in a diesel engine, fuel is injected during the compression stroke, as opposed to during the intake stroke in a spark-ignited engine. As a result, a diesel engine has less time to thoroughly mix the air and fuel before ignition occurs. The consequence is that diesel engine exhaust contains incompletely burned fuel known as particulate matter, or "soot". In addition to particulate matter, internal combustion engines including diesel engines produce a number of combustion products including hydrocarbons ("HC"), carbon monoxide ("CO"), nitrogen oxides ("$NO_x$"), and sulfur oxides ("$SO_x$"). Aftertreatment systems can be utilized to reduce or eliminate emissions of these and other combustion products.

Conventionally, effective emissions control by an engine aftertreatment system (EAS) requires temperatures of at least 200° C. to be attained before diesel exhaust fluid (DEF) dosing may commence. However, during the EAS heat-up period under cold-start conditions (i.e., at temperatures of less than 200° C.), there is no emissions control. Thus, increasing the availability of ammonia at exhaust temperatures of 200° C. or less for emissions control in diesel exhaust engines is important for diesel emissions control, particularly in view of increasingly stringent greenhouse gas and ultra-low $NO_x$ regulations. In a diesel engine, cold start emissions from the engine appear within the first 60 seconds after key-on, which occurs several minutes before a selective catalytic reduction (SCR) catalyst attains optimal temperature for NOx reduction (e.g., at 250-450° C.). The total duration of the cold start phase is about 600 seconds after key-on, corresponding to about 30 g of engine-out $NO_x$.

Existing methods for improving emissions control at the cold start phase are not sufficient to meet the greenhouse gas and ultra-low $NO_x$ regulations. One approach for shortening the SCR catalyst heat-up time is to locate a combined SCR and diesel particular filter (DPF) in the form of a SCR On-Filter (SCRF) closer to the engine. However, this is not sufficient to address the challenges posed by new ultra-low NOx emissions regulations.

Another approach is to include an additional small close-coupled SCR/ammonia oxide catalyst (AMOX) (i.e., a close-coupled SCR/AMOX (ccSCR)) and diesel exhaust fluid (DEF) dosing system as close to the engine as possible to take full advantage of the available heat. The inclusion of an AMOX decreases $N_2O$-make (greenhouse gas) from ammonia slip, as the diesel oxidation catalyst (DOC) is located downstream. Likewise, the DPF and SCR/AMOX of a traditional aftertreatment system are located downstream of the DOC. This results in the ccSCR experiencing direct and constant exposure to soot, sulfur, unburnt hydrocarbons, and excessive heat during prolonged high load operation, which results in premature aging relative to the traditional SCR catalyst downstream. In addition, because the ccSCR is located upstream of the DOC, desulfation during active regeneration is not possible, unless an alternative source of heat is provided. Consequently, having a ccSCR in addition to the traditional engine aftertreatment would increase cost and complexity (with dual DEF dosing and mixing), and present major controls and on board diagnostics (OBD) challenges.

An alternative approach for achieving ultra-low NOx targets is the use of a passive NOx adsorber (PNA) catalyst, which traps NOx at low temperatures and releases it within the SCR operating temperature range. However, this technology does not have the durability necessary to become a viable aftertreatment component for on-road heavy-duty diesel trucks.

There are a number of engine related thermal management strategies that are currently in development, including but not limited to driven turbochargers, variable timing for valve opening, and cylinder deactivation. The general concerns with engine design-based thermal management strategies are: time and cost of development, durability and reliability of new components, robustness of controls, unintended vibrations, and potential for increased soot and/or unburnt hydrocarbons negatively impacting aftertreatment performance and durability.

A further important consideration for the improvement of exhaust treatment is the advent of heavy-duty diesel powertrains that can have extended full useful life requirements (from 435,000 potentially as high as 1,000,000 miles) in the coming years.

It is believed that the numerous aftertreatment failures in the field are caused by prolonged exposure of traditional SCRs to un-decomposed DEF droplets (e.g., from ineffective mixing), which results in massive urea deposit formation, with potential structural damage to the catalyst and substrate (e.g., a ceramic substrate). For this reason, it is understood that it is generally not desirable to dose DEF onto a SCR catalyst. Even with an electrically-heated substrate (e.g., heated dosing), where the heated substrate serves as a hotplate that facilitates the 3-step urea decomposition process, urea deposits still form on the SCR:

Step 1. Water evaporation
Step 2. Thermolysis (urea→$NH_3$+HNCO)
Step 3. Hydrolysis (HNCO+$H_2O$→$NH_3$+$CO_2$)

Indeed, while a traditional titanium dioxide ($TiO_2$) hydrolysis catalyst coating applied to a heated metallic substrate can facilitate the reaction shown in equation (3), heated dosing using $TiO_2$-hydrolysis catalysts is unpredictable, with increasing urea deposit formation as the catalyst becomes increasingly hydrophobic with continued use. In addition, such a hydrolysis catalyst occupies valuable SCR volume needed for NOx reduction. These are the primary reasons that such hydrolysis catalysts have not been widely adopted in heavy-duty diesel truck applications. Instead, the current trend in the industry is to employ high electrical power (e.g., 20 kW) to rapidly heat up the hotplate and exhaust stream in heated dosing.

Thus, there is a need for systems that can increase the availability of ammonia at exhaust temperatures of 200° C. or less (e.g., under cold start conditions) for emissions control. The present disclosure fulfils these needs and presents further advantages.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, the present disclosure features a catalyst aftertreatment system, including: a dosing compartment including a doser configured to introduce a diesel exhaust fluid (DEF) including urea into a diesel exhaust; a mixing chamber subsequent to the doser configured to mix the DEF with the diesel exhaust, the mixing chamber including a static metallic mixer, and a catalyst substrate including a binary catalyst coated thereon; and a SCR unit subsequent to the mixing chamber unit, comprising an SCR catalyst configured to facilitate reduction of nitrogen oxide (NOx) in the diesel exhaust with $NH_3$. The binary catalyst includes a zeolite having a crystal lattice including a metal oxide, wherein the metal oxide is covalently bound to elements within the crystal lattice; or the binary catalyst includes a plurality of metal oxide nanoparticles hybridized to a zeolite, wherein the metal oxide nanoparticle has a maximum dimension of from 0.1 to 50 nm; or any combination thereof. The binary catalyst is configured to simultaneously hydrolyze urea to generate ammonia, store $NH_3$, and reduce $NO_x$ within 60 seconds of a cold start event, with no visible urea deposit formation on the catalyst substrate (or both the static metallic mixer and the catalyst substrate) over a period of at least 40 test runs (as described in Example 2 below), when the catalyst substrate (or the static metallic mixer and the catalyst substrate) is observed in a downstream end-on cross-sectional view.

In another aspect, the present disclosure features a method of treating diesel exhaust, including: providing a catalyst aftertreatment system of the present disclosure; directing flow of diesel exhaust through the dosing compartment, the mixing chamber, and the selective catalytic reduction (SCR) unit; introducing, by the doser in the dosing compartment, the diesel exhaust fluid (DEF) comprising urea into the diesel exhaust; and mixing, by the static metallic mixer and/or catalyst substrate in the mixing chamber, the DEF with the diesel exhaust, at least the catalyst substrate and optionally the static metallic mixer having the binary catalyst coated thereon. The binary catalyst converts at least some of the DEF to $NH_3$, stores $NH_3$, and reduces NOx in the engine exhaust with the $NH_3$ within 60 seconds of a cold start event, with no visible urea deposit formation on the catalyst substrate (or both the static metallic mixer and the catalyst substrate) over a period of at least 40 test runs (a test run is as described in Example 2, below), when the catalyst substrate (or the static metallic mixer and the catalyst substrate) is observed in a downstream end-on cross-sectional view.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1A:
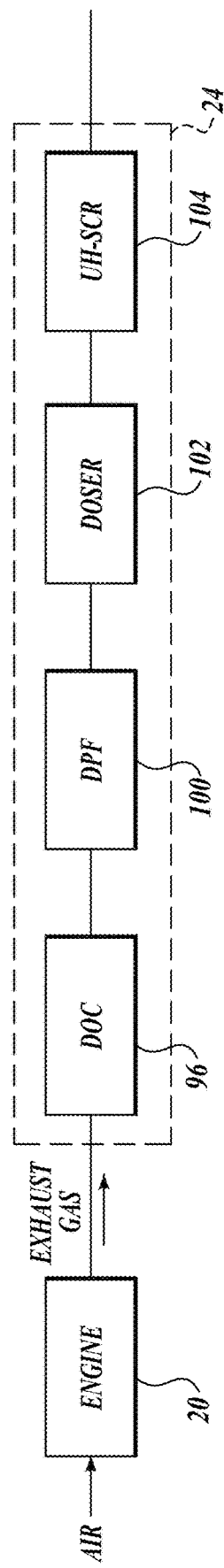
FIG. 1A is a block diagram of an example of an aftertreatment system coupled to an internal combustion engine.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well known aspects have not been described in detail in order to not unnecessarily obscure various aspects of the present disclosure. Further, it will be appreciated that embodiments of the present disclosure may employ any combination of features described herein.

The present disclosure describes a catalytic aftertreatment system that includes a dosing compartment including a dosing compartment including a doser configured to introduce a diesel exhaust fluid (DEF) including urea into a diesel exhaust; a mixing chamber subsequent to the doser configured to mix the DEF with the diesel exhaust, the mixing chamber including a static metallic mixer, and a catalyst substrate including a binary catalyst coated thereon; and a SCR unit subsequent to the mixing chamber unit, including an SCR catalyst configured to facilitate reduction of nitrogen oxide (NOx) in the diesel exhaust with $NH_3$. In some embodiments, the mixing chamber includes both a static metallic mixer and a catalyst substrate, and at least the catalyst substrate has a binary catalyst coated thereon. In some embodiments, both the static metallic mixer and the metallic substrate has a binary catalyst coated thereon.

In some embodiments, the static metallic mixer is a wire mesh static metallic mixer. In some examples, the wire mesh static metallic mixer has one or more of patterns, curves, bends, and/or any other feature that increases the likelihood that diesel exhaust mixing with the DEF. In some embodiments, the static metallic mixer is a tortuous path static mixer. Other examples of mixing chambers are described, for example, in U.S. patent application Ser. No. 14/486,217, which is hereby incorporated by reference in its entirety.

The catalyst substrate can be formed of thin metal foils, flat and corrugated, formed into a honeycomb structure with through-channels which is placed inside a metal shell. The catalyst substrates have high geometric surface area and low pressure drop associated with the thin walls. In some embodiments, the foils in metallic substrates can be brazed/welded together to provide good mechanical durability and resistance to thermal shock. In some embodiments, the catalyst substrate is formed of one or more of cordierite, silicon carbide, or aluminum titanate. In some embodiments, the catalyst substrate is an electrically heated catalyst (EHC), for example, available from Continental Automotive (e.g., Electrically Heated Catalyst EMICAT®). The catalyst substrate can have a porosity equal to or greater than about 65%, and the binary UH-SCR catalyst is applied as a washcoat to an internal surface area of the substrate. In another example, the catalyst substrate has a porosity equal to or greater than about 55%, and wherein the UH-SCR catalyst is applied as a washcoat to an internal surface area of the substrate.

The binary catalyst in the mixing chamber can include a zeolite having a crystal lattice including a metal oxide, wherein the metal oxide is covalently bound to elements within the crystal lattice (also referred to herein as an intracrystalline binary catalyst, "iCBC"); or the binary catalyst can include a plurality of metal oxide nanoparticles hybridized to a zeolite, wherein the metal oxide nanoparticle has a maximum dimension of from 0.1 to 50 nm (also referred to herein as a hybrid binary catalyst, "HBC"); or any combination thereof. In some embodiments, the binary catalyst can include both a population of zeolite having a crystal lattice including a metal oxide, wherein the metal oxide is covalently bound to elements within the crystal lattice; and a population of a plurality of metal oxide nanoparticles hybridized to a zeolite, wherein the metal oxide nanoparticle has a maximum dimension of from 0.1 to 50 nm. When exposed to urea and a diesel engine exhaust, the binary catalyst is configured to simultaneously hydrolyze urea to generate ammonia, store $NH_3$, and reduce $NO_x$ within 60 seconds of a cold start event, with no visible urea deposit formation on the catalyst substrate (or both the static metallic mixer and the catalyst substrate) over a period of at least 40 test runs (a test run is as described in Example 2, below), when the static metallic mixer and/or catalyst substrate is observed in a downstream end-on cross-sectional view. In some embodiments, the catalyst substrate, having a plurality of through-channels, does not have urea-clogged channels over a period of at least 40 test runs, where a urea-clogged channel is a channel that is obstructed with urea deposit such that engine exhaust cannot pass through the channel, resulting in increased $\Delta P$. In some embodiments, the obstruction in a catalyst substrate can be assessed by measuring the $\Delta P$, where a $\Delta P$ of about 0 over a given number of test runs indicates the absence of obstruction. The binary catalyst, whether in an iCBC or HBC configuration, will be described in greater detail below. In some embodiments, the zeolite of the binary catalyst is selected from Fe-doped aluminosilicate zeolites, Cu-doped aluminosilicate zeolites, Fe- and Cu-doped aluminosilicate zeolites, Fe-doped silico-alumino-phosphate zeolites, Cu-doped silico-alumino-phosphate zeolites, and Fe and Cu-doped silico-alumino-phosphate zeolites. In certain embodiments, the zeolite is a Fe- and/or Cu-doped silico-alumino-phosphate zeolite, and Fe- and/or Cu-doped aluminosilicate zeolite, in combination. In certain embodiments, the zeolite is selected from SSZ-13 chabazite and aluminosilicate zeolites having SSZ-type zeolite structures, the zeolite can be doped with Fe and/or Cu. The zeolite can include a silicon to aluminum ratio (Si/Al) of from 2 to 25. In some embodiment, the zeolite of the binary catalyst includes silicon and aluminum, and is a small pore zeolite having maximum pore diameter of less than or equal to 5 angstroms.

In some embodiments, the metal oxide nanoparticle or the metal oxide of the binary catalyst is selected from the group consisting of yttrium oxide, zirconium oxide, vanadium oxide, cerium oxide, manganese oxide, cobalt oxide, iron oxide, and any combination thereof.

The binary catalyst composition can have from 0.05 wt % to 5 wt % of metal oxide when the metal oxide is covalently bound to elements within the crystal lattice of the zeolite. When the plurality of metal oxide nanoparticles is hybridized to a zeolite, the binary catalyst composition can have from 0.5 to 30 wt % of a plurality of metal oxide nanoparticles.

The mixing chamber can include a heating element thermally coupled to the static metallic mixer and/or the catalyst substrate. For example, the heating element can be an electrical heating element. The heating element can be connected to a controller.

In some embodiments, the engine aftertreatment system can further include have a SCRF downstream to the mixing chamber unit and preceding the SCR unit.

When the engine aftertreatment system is used to treat diesel exhaust, the treatment can include providing a catalyst aftertreatment system of the present disclosure; directing flow of diesel exhaust through the dosing compartment (where a doser is connected to the exhaust flow path and DEF is sprayed into the flow path), the mixing chamber, and the selective catalytic reduction (SCR) unit; introducing, by the doser, the diesel exhaust fluid (DEF) including urea into the diesel exhaust; mixing, by the static metallic mixer and/or the catalyst substrate in the mixing chamber, the DEF with the diesel exhaust, at least the catalyst substrate and optionally the static metallic mixer having the binary catalyst coated thereon. The binary catalyst converts at least some of the DEF to $NH_3$, stores $NH_3$, and reduces NOx in the engine exhaust with the $NH_3$ within 60 seconds of a cold start event, with no visible urea deposit formation on the catalyst substrate (or both the static metallic mixer and the catalyst substrate) over a period of at least 40 test runs, when the catalyst substrate (or the static metallic mixer and the catalyst substrate) is observed in a downstream end-on cross-sectional view. In some embodiments, the catalyst substrate, having a plurality of through-channels, does not have urea clogged channels over a period of at least 40 test runs.

As discussed above, the mixing chamber can further include a heating element thermally coupled to the static metallic mixer and/or the catalyst substrate, and treatment of the diesel exhaust can include heating the static metallic mixer and/or the catalyst substrate to a temperature of from 25° C. to 400° C. (e.g., from 50° C. to 400° C., from 50° C. to 350° C., from 70° C. to 200° C., from 70° C. to 150° C., or from 100° C. to 200° C.). In some embodiments, treatment of the diesel exhaust can include electrically heating the static metallic mixer and a 1-Liter 300 cpsi binary catalyst-coated catalyst substrate at a power of from 2 kW to 10 kW (e.g., 2 kW to 8 kW, 2 kW to 6 kW, or 4 kW to 8 kW). In some embodiments, treatment of the diesel exhaust can include electrically heating the static metallic mixer and a 10-Liter 300 cpsi binary catalyst-coated catalyst substrate at a power of from 10 kW to 20 kW. Although the use of heat in the engine exhaust treatment can result in a carbon dioxide penalty, the present disclosure minimizes the use of onboard power applied to the mixing chamber of the engine aftertreatment system including the metallic mixer and the catalyst substrate, and also minimizes the quantity of DEF dosing required during cold start and low load operation, thereby minimizing the carbon footprint per trip.

During operation, the engine aftertreatment system of the present disclosure can include converting DEF to $NH_3$ at a temperature lower than the temperature of thermolysis of urea. The mixing chamber can produce $NH_3$ in an amount of greater than 5.6 g at 80° C. The mixing chamber can reduce $NO_x$ in an amount of greater than 80% (e.g., greater than 85%, greater than 90%) at 80° C. In some embodiments, upon dosing the diesel exhaust with DEF, the mixing chamber begins converting $NH_3$ within 30 seconds of a cold start.

Definitions

As used herein, "hybridization," "hybridizing," or "hybridized" refers to the chemical reaction between precursor molecules with specific elements on the surface of the (metal) zeolite, resulting in formation of bonds (e.g., covalent bonds, and/or ionic bonds) between the precursors and elements in the (metal) zeolite in the metal oxide nanoparticles. The hybridization can be verified using scanning transmission electron microscopy with elemental analysis, X-ray diffraction, and electron energy loss spectroscopy (EELS) microstructural analysis techniques. For example, elemental mapping of metal oxide and any cationic dopants can show an aggregate of metal oxide nanoparticle, and Si and/or Al in the zeolite can be present in the metal oxide phase, with no zeolite crystal present in the background. Furthermore, STEM studies can indicate that the metal oxide phase is crystalline. Therefore, it is reasonable to assume that the incorporation of Si and Al into the metal oxide phase is by way of covalent and/or ionic bonds in the $ZrO_2$ crystal lattice. Without wishing to be bound by theory, it is believed that a metal oxide precursor first forms a coordination bond with the surface atoms of a zeolite (i.e., Si and/or Al), which is facilitated by the use of a chelating agent, such as urea, in the reaction mixture. The formation of this coordination complex causes disruptions in the crystal structure near the surface. Therefore, a certain degree of deconstruction of the zeolite surface layer(s) occurs to release Si and/or Al for incorporation into the metal oxide phase as it forms.

As used herein, "intra-crystalline" refers to incorporation of an element into a host material's crystal lattice structure, where the element occupies a crystal lattice site that would otherwise be occupied by an atom of the host material. The element forms one or more covalent bonds with the atoms of the crystal lattice and can replace a host's atom in the crystal lattice.

As used herein, "loading" is synonymous to "exchanging," and "loaded" is synonymous to "exchanged," and refer to the replacement of one cation at an ion exchange site in the zeolite with a target cation (e.g., $Cu^{2+}$ and/or $Fe^{3+}$), through an ion exchange mechanism.

As used herein, "doping" refers to the formation of covalent bonds where an introduced cation becomes incorporated into the lattice structure of the host. For example, doping occurs when elements such as yttrium are introduced into the metal oxide $ZrO_2$, and when copper from an exemplary Cu-loaded SSZ-13 framework is scavenged by the metal oxide (where the copper is covalently bound into the metal oxide's lattice structure). Therefore, compared to loading, doping is a more permanent form of cation sequestration.

As used herein, "microporous" refers to material having pores of a maximum pore dimension of up to 2 nm, "mesoporous" refers to a material having pores of a maximum pore dimension of from 2 to 50 nm, and "macroporous" refers to a material having pores of a maximum pore dimension of greater than 50 nm. The maximum pore dimension refers to the maximum cross-section in a given pore of irregular or regular shape.

As used herein, "oxidative power" is defined as the temperature at which 50% of the CO is oxidized to $CO_2$ when a simulated exhaust stream including nitric oxide (600 ppm), ethylene (75 ppm $C_2H_4$), CO (300 ppm), oxygen (10%), carbon dioxide (5.6%), water (6%), and nitrogen (the balance of simulated exhaust stream), is exposed to a catalyst (e.g., a metal oxide catalyst) at a space velocity of 60,000 $hr^{-1}$ in a reverse light off study (starting at 600° C., to a temperature of 160° C.). As an example, a metal oxide with a relatively low oxidative power has a ($T_{50}$CO) of >600° C. (e.g., $ZrO_2$), while a metal oxide with relatively high oxidative power has a ($T_{50}$CO) of <500° C. As used herein, "reductive power" refers to the ability to enhance the $NO_x$ storage property to enhance $NO_x$ conversion.

As used herein, "significantly" or "substantially" refers to greater than 90% (e.g., greater than 95%, or greater than 98%).

As used herein, "about" refers to ±5% (e.g., ±3%) of a given value. As used herein, a selective catalytic oxidation (SCO) catalyst is a catalyst that facilitates:

(1) Formation of $NO_2$ species in situ by the reaction of $NO+\frac{1}{2}O_2 \rightarrow NO_2$, to serve as reactive intermediates from nitrogen oxides in the exhaust stream, without significantly oxidizing $NH_3$ into $N_2O$. For embodiments of the catalysts of the present disclosure, even if $NH_3$ oxidation occurs, in some instances the primary product is $N_2$, which is a desirable outcome.

(2) Hydrocarbon oxidation at considerably lower temperatures, for example, the oxidation of longer chain unsaturated hydrocarbons such as propylene.

As used herein, a selective catalytic reduction (SCR) catalyst is a catalyst that catalyzes the reduction of $NO_x$ to nitrogen and water.

As used herein, a urea hydrolysis catalyst is a catalyst that hydrolyzes urea and isocyanic acid (HNCO) with minimal or zero formation of high molecular weight aromatic (HMAr) compounds such as cyanuric acid, ammilide, ammeline, and/or melamine.

As used herein, a urea hydrolysis-selective catalytic reduction (UH-SCR) catalyst is a catalyst that both catalyzes the reduction of $NO_x$ to nitrogen and water and that hydrolyzes urea and isocyanic acid (HNCO) with minimal or zero formation of high molecular weight aromatic (HMAr) compounds such as cyanuric acid, ammilide, ammeline, and/or melamine As used herein, a DPF catalyst is a catalyst that captures soot particles and contains platinum group metals (PGM) for $NO_2$-make to facilitate soot lightoff at relatively low temperatures (e.g., <350° C.) for passive soot oxidation. The DPF can also serve as an ash storage device.

As used herein, a DOC is a catalyst that oxidizes gases and other volatile particulates from the engine exhaust, including hydrocarbons, CO and NO (which is oxidized to make $NO_2$, made possible by the relatively high PGM loading.

As used herein, an ammonia oxidation (AMOX) catalyst is a catalyst that includes a layer of PGM (such as a DOC), covered by a SCR catalyst layer, which is located after a SCR to carry out dual functions of (1) reducing $NO_x$, and (2) scavenge excess $NH_3$ and selectively oxidize $NH_3$ to $N_2$, thus avoiding $NH_3$ slip.

As used herein, a 4-way catalyst is a catalyst that can serve the roles of a DOC, DPF catalyst, SCR catalyst, urea hydrolysis catalyst, and AMOX catalyst concurrently.

Unless otherwise defined, all technical and scientific terms used herein have the same meaning as commonly understood by one of ordinary skill in the art. Although methods and materials similar or equivalent to those described herein can be used in the practice or testing of the present disclosure, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

It will be readily understood that the aspects of the present disclosure, as generally described herein, and illustrated in the FIGURES, can be arranged, substituted, combined, separated, and designed in a wide variety of different configurations, all of which are explicitly contemplated herein.

Furthermore, the particular arrangements shown in the FIGURES should not be viewed as limiting. It should be understood that other embodiments may include more or less of each element shown in a given FIGURE. Further, some of the illustrated elements may be combined or omitted. Yet further, an example embodiment may include elements that are not illustrated in the FIGURES.

Aftertreatment Catalytic System

FIG. 1A shows a block diagram providing a brief overview of a vehicle powertrain of the present disclosure. The components include an internal combustion engine 20 in flow communication with one or more selected components of an exhaust aftertreatment system 24. The exhaust aftertreatment system 24 optionally includes a catalyst system 96 upstream of a particulate filter 100. In the embodiment shown, the catalyst system 96 is a diesel oxidation catalyst (DOC) 96 coupled in flow communication to receive and treat exhaust from the engine 20. The DOC 96 is preferably a flow-through device that includes either a honeycomb-like or plate-like substrate. The substrate has a surface area that includes (e.g., is coated with) a catalyst. The catalyst can be an oxidation catalyst, which can include a precious metal catalyst, such as platinum or palladium, for rapid conversion of hydrocarbons, carbon monoxide, and nitric oxides in the engine exhaust gas into carbon dioxide, water, or $NO_2$.

Once the exhaust has flowed through DOC 96, the diesel particulate filter (DPF) 100 is utilized to capture unwanted diesel particulate matter from the flow of exhaust gas exiting engine 20, by flowing exhaust across the walls of DPF channels. The diesel particulate matter includes sub-micron sized solid and liquid particles found in diesel exhaust. The DPF 100 can be manufactured from a variety of materials including but not limited to cordierite, silicon carbide, and/or other high temperature oxide ceramics.

Figure 1B:
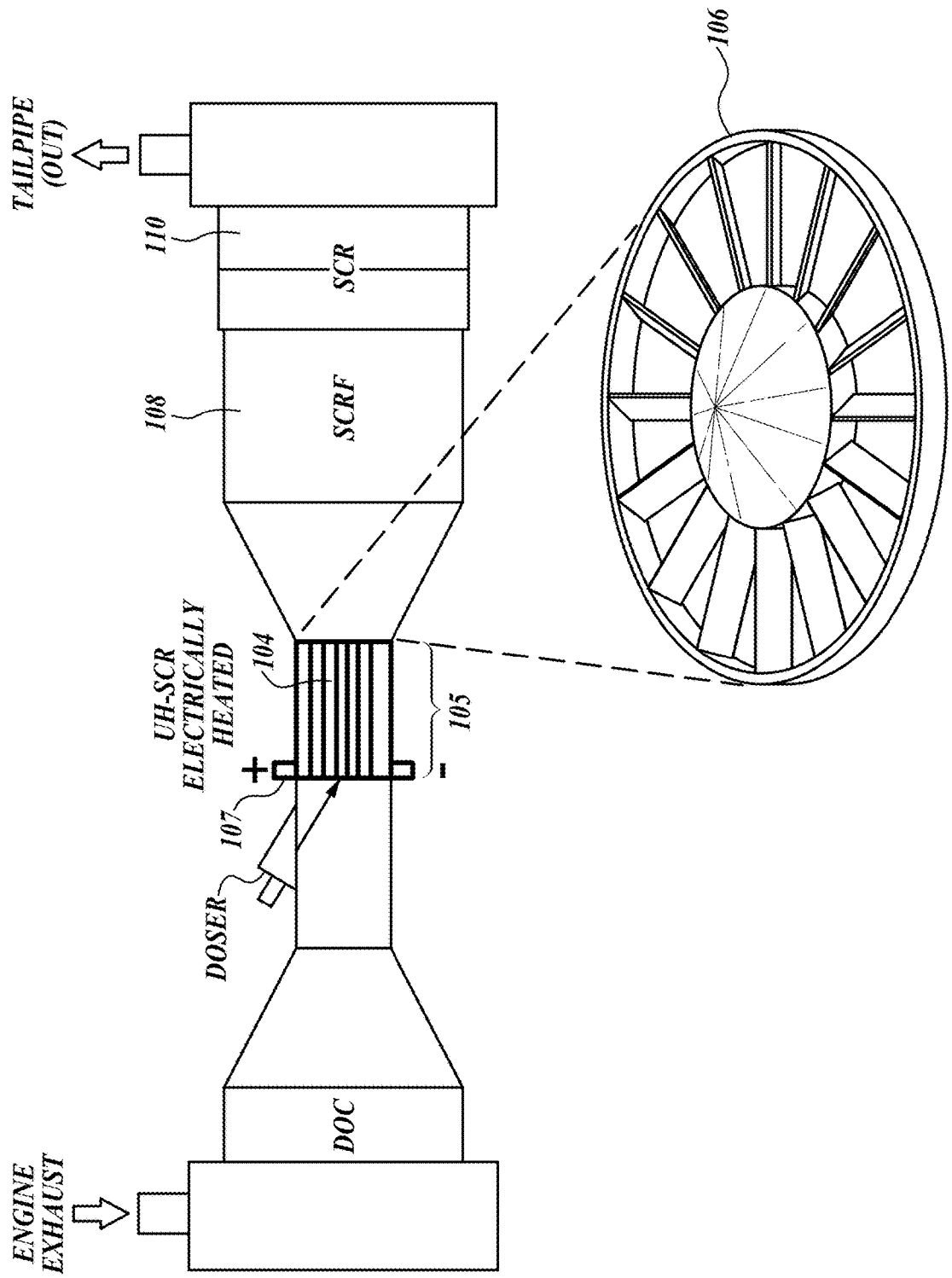
FIG. 1B is an illustration of an embodiment of an aftertreatment system of the present disclosure.

The treated exhaust gases can then proceed through a compartment containing a diesel exhaust fluid (DEF) doser 102 for the introduction of a reductant, such as ammonia or a urea solution. The exhaust gases then flow to a urea hydrolysis-selective catalytic (UH-SCR) core 104, which is formed of a catalyst substrate that is coated with a UH-SCR binary catalyst, and which is located in a mixing chamber 105 (FIG. 1B). Referring to FIG. 1B, the mixing chamber 105 that includes a UH-SCR unit 104 can also include a static metallic mixer such as a swirl mixer having a central cone with radially positioned baffles 106, and catalytic core 104 can precede the static metallic mixer. The static metallic mixer can optionally also be coated with a binary UH-SCR catalyst. The mixing chamber 105 can be surrounded by a heating unit 107, which can be coupled to a controller. The catalyst substrate can be formed of a spirally wound metallic foil having a plurality of through channels (e.g., an EHC). The substrate can be anchored to a metallic shell in the form of a tube using pins. The metallic shell can be thermally coupled to a heating unit. During operation, the engine exhaust and DEF spray first flow through the channels of the catalyst substrate where the heater is coupled, then downstream of the heater to the remaining portions of the aftertreatment system. The aftertreatment system further includes a SCR unit 110 downstream from the mixing chamber 104, and optionally include a SCRF unit 108 preceding the SCR.

Referring again to FIG. 1A, system 24 can include one or more sensors (not illustrated) associated with components of the system 24, such as one or more temperature sensors, $NO_x$ sensor, $NH_3$ sensor, oxygen sensor, mass flow sensor, particulate sensor, and a pressure sensor.

As discussed above, the exhaust aftertreatment system 24 includes a urea-hydrolysis-selective catalytic reduction (UH-SCR) catalytic core 104. The UH-SCR catalytic core 104 includes a urea hydrolysis-selective catalytic reduction catalyst coated on a catalytic substrate, the catalyst interacts with $NO_x$ gases to convert the $NO_x$ gases into $N_2$ and water, in the presence of an ammonia reductant. The overall reactions of $NO_x$ reductions in UH-SCR are shown below.

$$4NO+4NH_3+O_2 \rightarrow 4N_2+6H_2O \quad (1)$$

$$6NO_2+8NH_3 \rightarrow 7N_2+12H_2O \quad (2)$$

$$2NH_3+NO+NO_2 \rightarrow 2N_2+3H_2O \quad (3)$$

Where Equation (1) represents a standard SCR reaction and Equation (3) represents a fast SCR reaction.

Figure 1C:
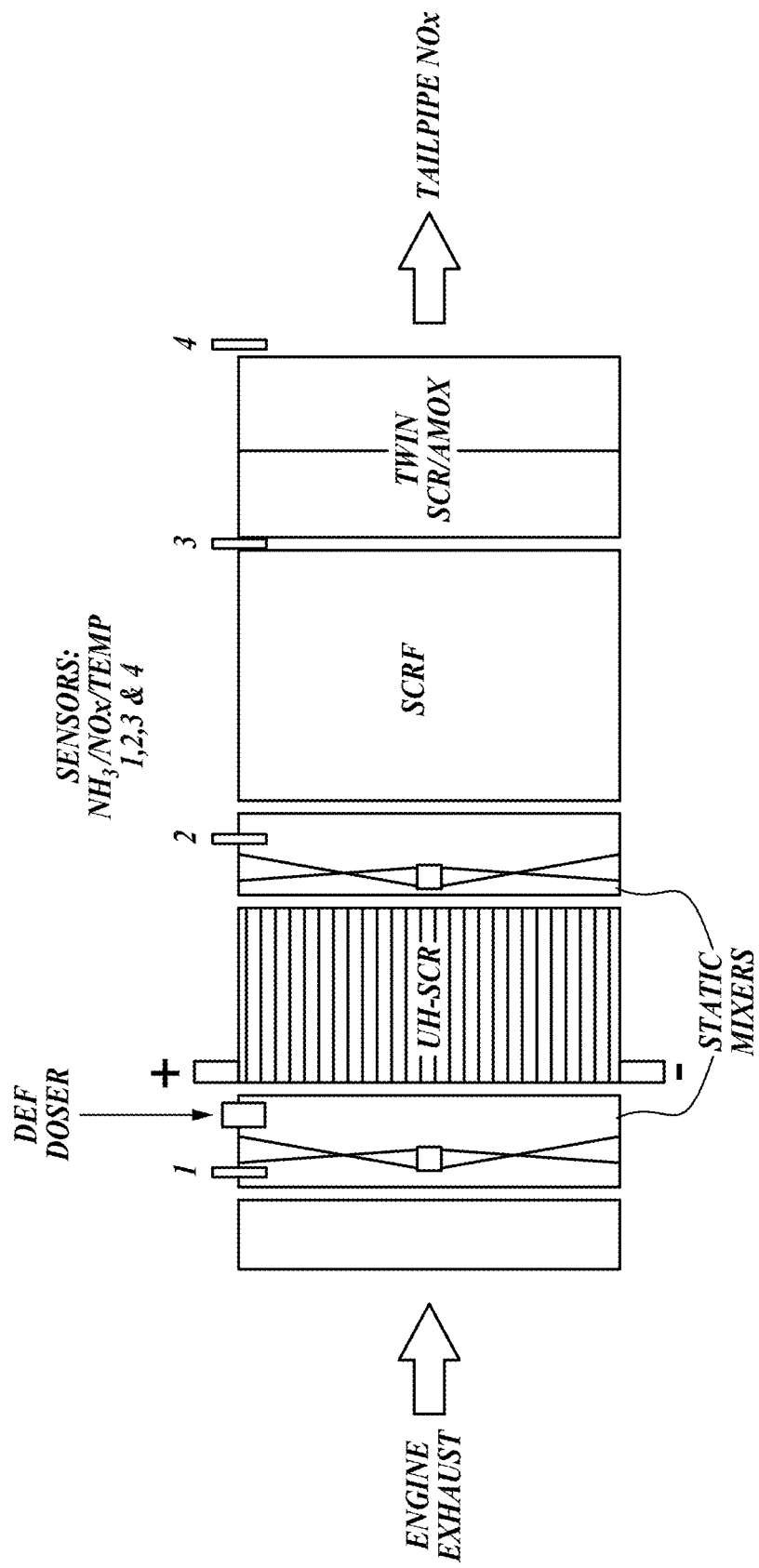
FIG. 1C is an illustration of an embodiment of an aftertreatment system of the present disclosure.
Figure 1D:
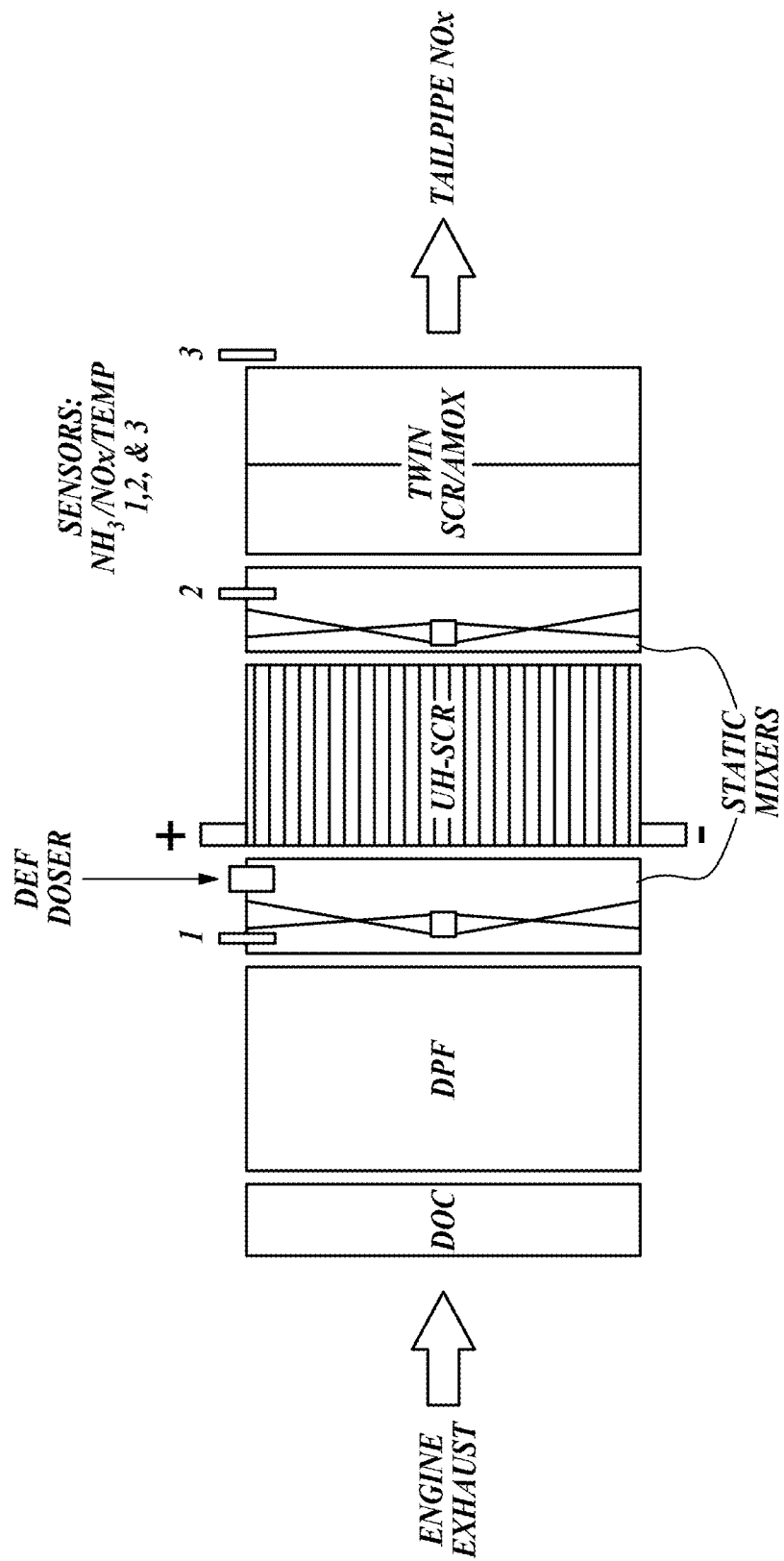
FIG. 1D is an illustration of an embodiment of an aftertreatment system of the present disclosure.

Depending on the aftertreatment system, the UH-SCR catalyst-coated metallic substrate (e.g., the catalyst core), the heating unit, and/or the UH-SCR electrically heated catalyst can have varying sizes. The UH-SCR catalyst core can have a catalytic substrate of varying sizes, depending on the aftertreatment system. For example, in some embodiments, it is believed that scaling a 1-liter catalyst substrate coated with a UH-SCR catalyst by a factor of ten (FIG. 1B) provides sufficient SCR catalyst with pre-stored ammonia and urea decomposition capability to reduce up to 50 g of cold start EO NOx. FIG. 1C is a schematic illustration of a full-scale UH-SCR in a SCRF-modified aftertreatment system. FIG. 1D is an illustration of a full scale UH-SCR in a traditional aftertreatment system.

In some embodiments, the engine aftertreatment system of the present disclosure encompasses a thermally integrated catalyst aftertreatment (TICA) diesel exhaust system, as described in U.S. patent application Ser. No. 14/935,125, filed Nov. 6, 2015, and entitled "Thermally Integrated Compact Aftertreatment System," incorporated herein in its entirety.

Figure 1E:
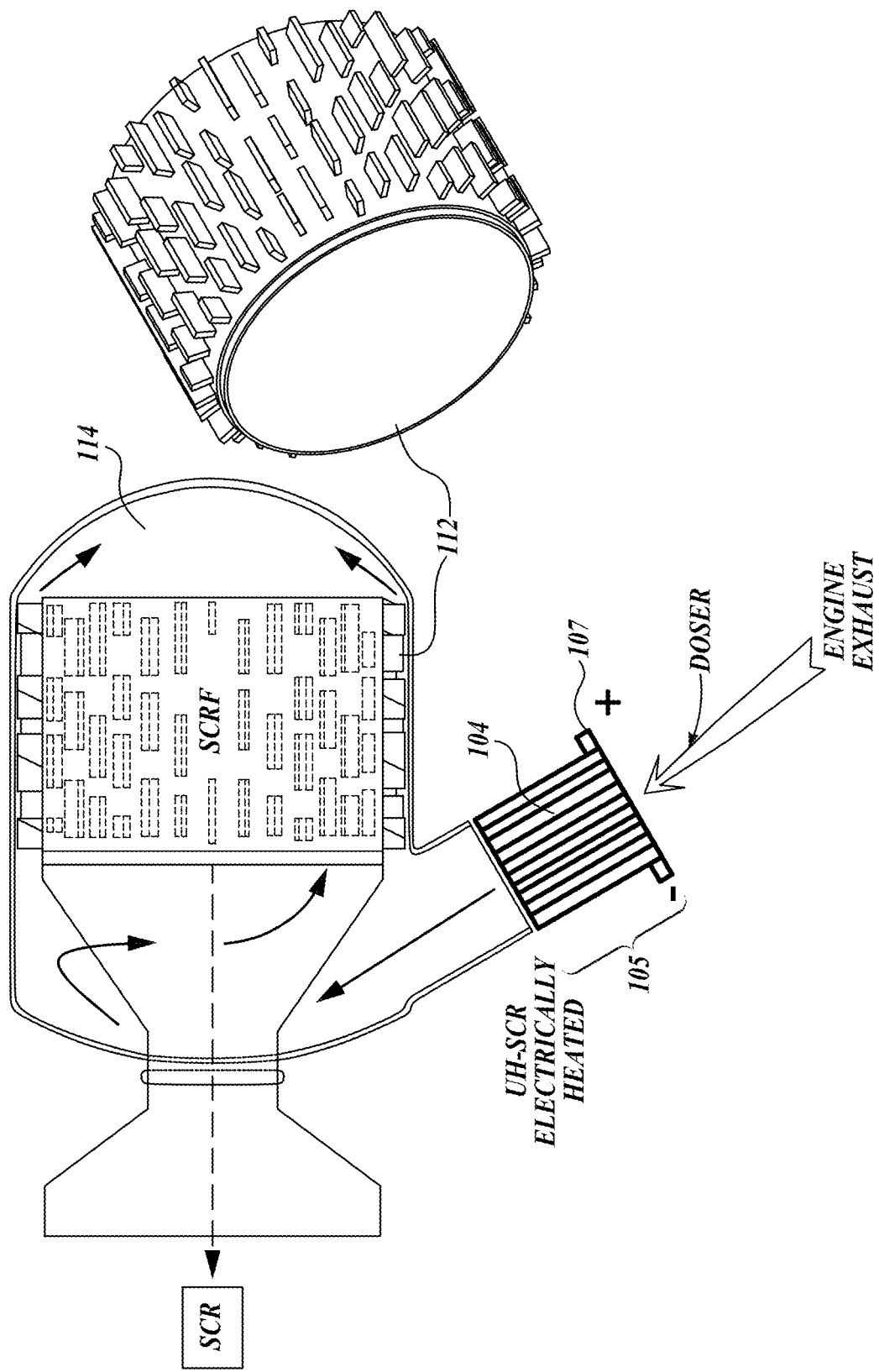
FIG. 1E is an illustration of an embodiment of an aftertreatment system of the present disclosure.
Figure 1F:
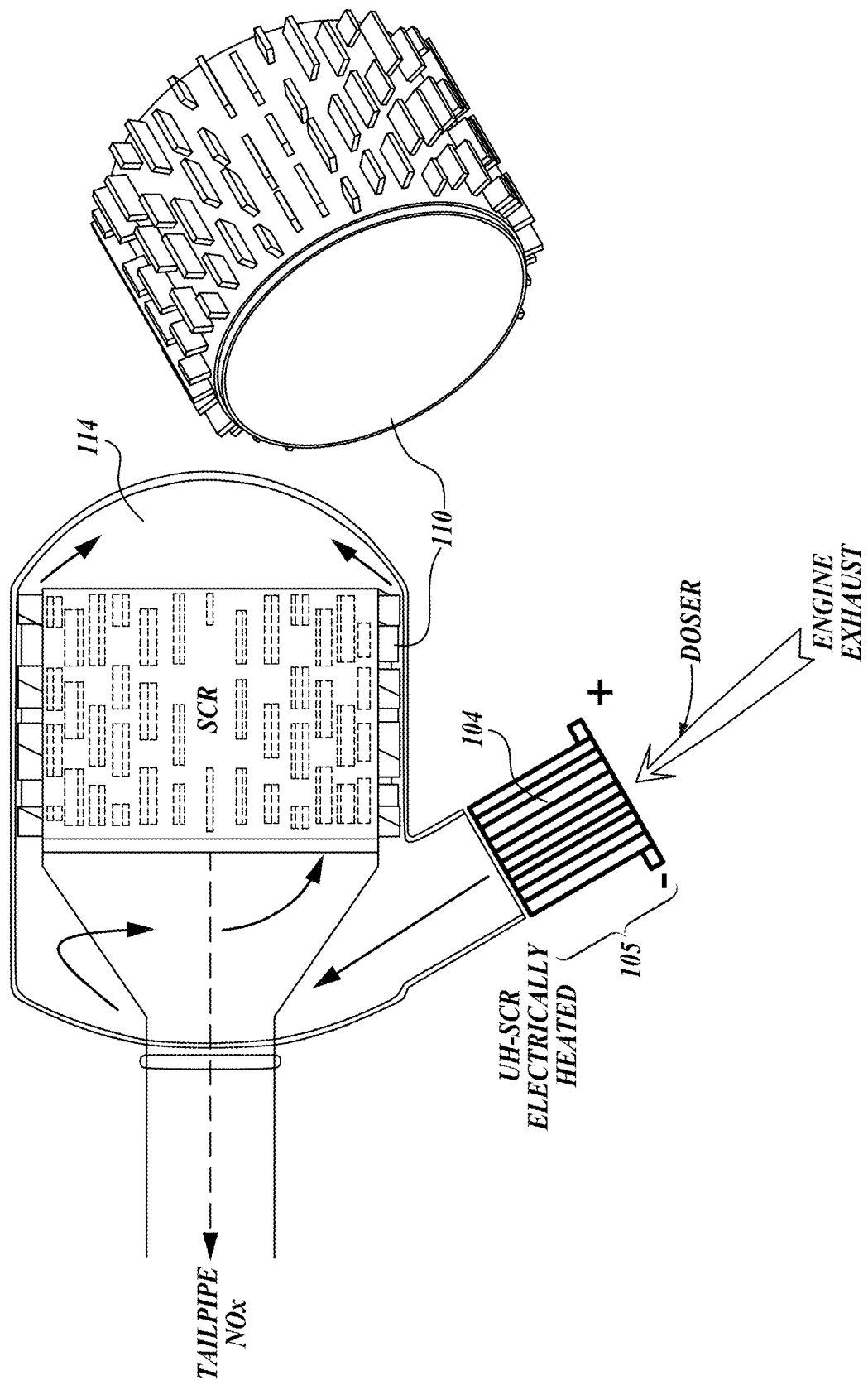
FIG. 1F is an illustration of an embodiment of an aftertreatment system of the present disclosure.

As an example, FIG. 1E is an cross-sectional illustration of a thermally integrated engine aftertreatment system including an electrically-heated UH-SCR unit 105, with a UH-SCR binary catalyst-coated heat transfer mixing baffles 112 surrounding a SCRF unit in an annular space 114, which can maintain heat during low load operation. Alternatively, instead of having a SCRF unit in the annular space, referring to FIG. 1F, a SCR unit 110 can take its place. The thermally-integrated engine aftertreatment system can be relatively small, having a volume of 1 to 3 liters.

A TICA exhaust system can include a flow channel that directs flow of the diesel exhaust from a diesel oxidation catalyst unit, to a dosing compartment that introduces diesel exhaust fluid (DEF) into the diesel exhaust, to a UH-SCR mixing chamber that includes an catalyst substrate (e.g, an EHC) coated with a UH-SCR binary catalyst, and to a selective catalytic reduction (SCR) unit. A first portion of the flow channel before the diesel exhaust reaches the dosing compartment is in direct thermal contact with a second portion of the flow channel that houses the SCR unit such that heat from the diesel exhaust before the diesel exhaust reaches the dosing compartment is passed to the SCR unit. The first and second portions of the flow channel are in direct thermal contact if they are either integrally formed together or in direct physical contact with each other.

Figure 2:
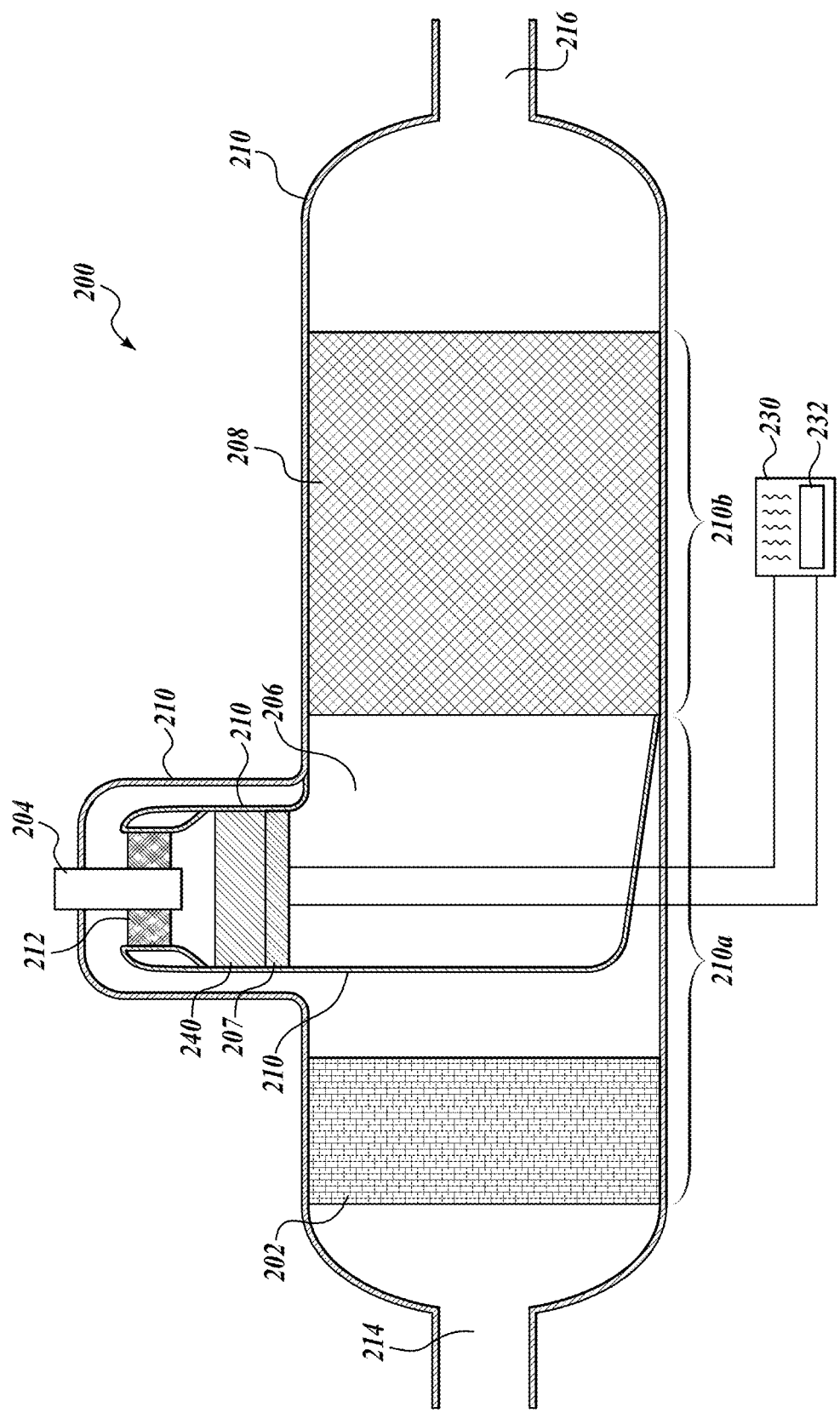
FIG. 2 is an illustration of an embodiment of an aftertreatment system of the present disclosure.

FIG. 2 depicts an embodiment of a TICA exhaust system 200 usable in an EAS. The TICA exhaust system 200 includes a diesel oxidation catalyst unit 202, a doser 204, a mixing chamber 206 that includes a static metallic mixer 207 and a catalyst substrate 240 having a UH-SCR binary catalyst coated thereon, and a selective catalytic reduction (SCR) unit 208. The TICA exhaust system 200 also includes a flow channel 210 configured to direct flow of the diesel exhaust from the diesel oxidation catalyst unit 202, to the doser 204, to the mixing chamber 206, and to the SCR unit 208.

The diesel oxidation catalyst unit 202 includes a diesel oxidation catalyst configured to convert a portion of diesel exhaust into one or more of water or carbon dioxide. In some embodiments, the diesel oxidation catalyst is an oxidation catalyst that oxidizes diesel pollutants (e.g., carbon monoxide, gas phase hydrocarbons, organic fraction of diesel particulates) into products that are harmless or less harmful (e.g., water or carbon dioxide). In one example, hydrocarbons can be oxidized to form carbon dioxide and water vapor. In another example, carbon monoxide can be oxidized to form carbon dioxide.

The doser 204 is configured to introduce DEF into the diesel exhaust. The mixing chamber 206 is configured to permit mixing of the DEF with the diesel exhaust. In the embodiment shown, the mixing chamber 206 includes baffles 212 configured to create a swirl flow pattern of the diesel exhaust. In some embodiments, the baffles 212 are configured to create the swirl flow pattern of the diesel exhaust before introduction of the DEF from the doser 204. In some embodiments, the doser 204 and the mixing chamber 206 are configured such that DEF introduced by the doser 104 is uniformly mixed with the diesel exhaust before the mixed diesel exhaust and DEF enter the SCR unit 208.

In the embodiment shown in FIG. 2, the mixing chamber 106 includes the static metallic mixer 207 to aid in the mixing of the DEF introduced by the doser 204 with the diesel exhaust, and UH-SCR catalytic core 240 to convert at least some of the DEF to $NH_3$, store $NH_3$, and reduce NOx in the engine exhaust with the $NH_3$ within 60 seconds of a cold start event, with no visible urea deposit formation on the catalyst substrate of the UH-SCR catalytic core (or both the static metallic mixer 207 and the catalyst substrate 240) over a period of at least 40 test runs, when the catalyst substrate (or the static metallic mixer and the catalyst substrate) is observed in a downstream end-on cross-sectional view. In some embodiments, the static metallic mixer 207 is a wire mesh static metallic mixer. In some examples, the wire mesh static metallic mixer has one or more of patterns, curves, bends, and/or any other feature that increases the likelihood that diesel exhaust mixing with the DEF. In some embodiments, the static metallic mixer 207 is a tortuous path static mixer. Other examples of mixing chambers are described, for example, in U.S. patent application Ser. No. 14/486,217, which is hereby incorporated by reference in its entirety.

As discussed above, a UH-SCR binary catalyst can be coated on the catalytic substrate of catalytic core 240 (e.g., coated on the entire catalyst substrate or coated on at least a portion of the catalyst substrate) and/or the static metallic mixer 207 (e.g., coated on the entire static metallic mixer 207 or coated on at least a portion of the static metallic mixer 207). In one embodiment, at least a portion of the internal wall surfaces, up to the entire portion of the internal wall surfaces, of the mixing chamber 206 and connecting pipes can be coated with a UH-SCR binary catalyst to enhance conversion of urea to gaseous ammonia and to minimize urea deposit formation.

The SCR unit 208 includes an SCR catalyst configured to facilitate hydrolysis of a portion of the thermolysis decomposition product from DEF. The SCR unit 208 (and any other SCR unit described herein) can be coated with an SCR catalyst. In one embodiment, the SCR catalyst is configured to facilitate reduction of nitrogen oxide (NOx) in the diesel exhaust with the $NH_3$. In some embodiments, the SCR unit 208 is integrated with a diesel particulate filter (DPF) unit to form an SCRF unit. In general, a DPF is a device designed to remove diesel particulate matter or soot from the diesel exhaust. In some embodiments, the SCRF unit (i.e., the integrated SCR unit 208 and DPF) is configured to filter soot and passively oxidize the diesel exhaust simultaneously with NOx reduction.

The flow channel 210 includes an inlet 214 and an outlet 216. In some embodiments, the aftertreatment system 200 is placed on a vehicle such that diesel exhaust from the engine enters the aftertreatment system 200 through the inlet 214 and exits the exhaust system 200 toward a tail pipe of the vehicle. The flow channel 210 directs flow of the diesel exhaust from the inlet 214 to the diesel oxidation catalyst unit 202, to the doser 204, to the mixing chamber 206, to the SCR unit 208, and out of the outlet 216.

A first portion of the flow channel 210a is in direct thermal contact with a second portion of the flow channel 210b. The first portion of the flow channel 210a is located such that diesel exhaust flowing from the inlet 214 to the outlet 216 passes by the first portion of the flow channel 210a before the diesel exhaust reaches the doser 204. The second portion of the flow channel 210b houses the SCR unit 208. The first portion of the flow channel 210a is in direct thermal contact with the second portion of the flow channel 210b and they are in direct physical contact with each other. Thus, before the diesel exhaust reaches the doser 204, heat from the diesel exhaust is passed to the SCR unit 208 via the first portion of the flow channel 210a and the second portion of the flow channel 210b.

In other embodiments, as depicted in FIG. 2, the aftertreatment system 200 includes a heat system 230 configured to heat the static metallic mixer 207 and/or the UH-SCR catalyst-coated catalyst core 240. In some examples, the heat system 230 is an integral part of the aftertreatment exhaust system, a removable part of the aftertreatment exhaust system, a part of a vehicle on which the aftertreatment system is installed, and the like. In some embodiments, the heat system 230 is an electrical heat system configured to supply electrical power to the static metallic mixer 207 and/or the UH-SCR catalyst-coated catalyst substrate to elevate or maintain a temperature of the DEF hydrolysis catalyst coated on the static metallic mixer 207 and/or UH-SCR catalyst core 240.

In some embodiments, the aftertreatment system 200 includes a control unit 232 configured to control the electrical power supplied to the static metallic mixer 207 and/or the UH-SCR catalyst core 240 such that the temperature of the DEF hydrolysis catalyst is maintained independent of any heat transferred from the first portion of the flow channel 110a via the second portion of the flow channel 110b to the SCR unit 108. In some examples, the heat system 230 includes the control unit 232 (as shown in FIG. 2). In other embodiments, the heat system 230 is included in the aftertreatment system 200 separate from the heat system 230 or the heat system 230 is included in a vehicle on which the aftertreatment system 200 is installed. Other examples of heating systems are described, for example, in U.S. patent application Ser. No. 14/486,858 and U.S. patent application Ser. No. 14/486,217, which are hereby incorporated by reference in their entirety. Any of the heating systems may be used with any of the other embodiments of the exhaust systems disclosed herein.

Catalyst

The catalyst compositions of the present disclosure are described, for example, in U.S. application Ser. No. 15/612,815, filed Jun. 2, 2017 and entitled "Hybrid Binary Catalysts, Methods and Uses Thereof;" U.S. application Ser. No. 15/612,833, filed Jun. 2, 2017 and entitled "4-Way Hybrid Binary Catalysts, Methods and Uses Thereof;" U.S. application Ser. No. 16/377,035, filed Apr. 5, 2019 and entitled "Intra-Crystalline Binary Catalysts and Uses Thereof;" and U.S. application Ser. No. 16/376,980, filed Apr. 5, 2019 and entitled "Ammonia Facilitated Cation Loading of Zeolite Catalysts," each of which is herein incorporated by reference in its entirety.

As discussed above, the binary catalyst on the catalyst substrate in the mixing chamber can include a zeolite having a crystal lattice including a metal oxide, wherein the metal oxide is covalently bound to elements within the crystal lattice (also referred to herein as an intracrystalline binary catalyst, "iCBC"); or the binary catalyst can include a plurality of metal oxide nanoparticles hybridized to a zeolite, wherein the metal oxide nanoparticle has a maximum dimension of from 0.1 to 50 nm (also referred to herein as a hybrid binary catalyst, "HBC"); or any combination thereof.

Without wishing to be bound by theory, it is believed that the inclusion of the metal oxide nanoparticles (a selective catalytic oxidation (SCO) phase) provides the low temperature urea decomposing properties of the binary catalyst formulations of the present disclosure (FIG. 3), as described, for example, in U.S. Pat. No. 9,849,444, issued Dec. 26, 2017 and entitled "Urea Hydrolysis Reactor for Selective Catalytic Reduction, herein incorporated by reference in its entirety. Meanwhile, the Cu or Fe-doped zeolite provides the required ammonia storage and NOx reduction properties.

There are two ways to incorporate the metal oxide nanoparticles into the zeolites, each providing a different architecture to the resulting binary catalyst:

1. Covalent linkage of the metal oxide nanoparticles to the outer surfaces of the zeolite crystal provides a hybrid binary catalyst (HBC),
2. Incorporation of the metal oxide within the crystal's lattice structure provides an intra-crystalline binary catalyst (i-CBC).

Figure 3:
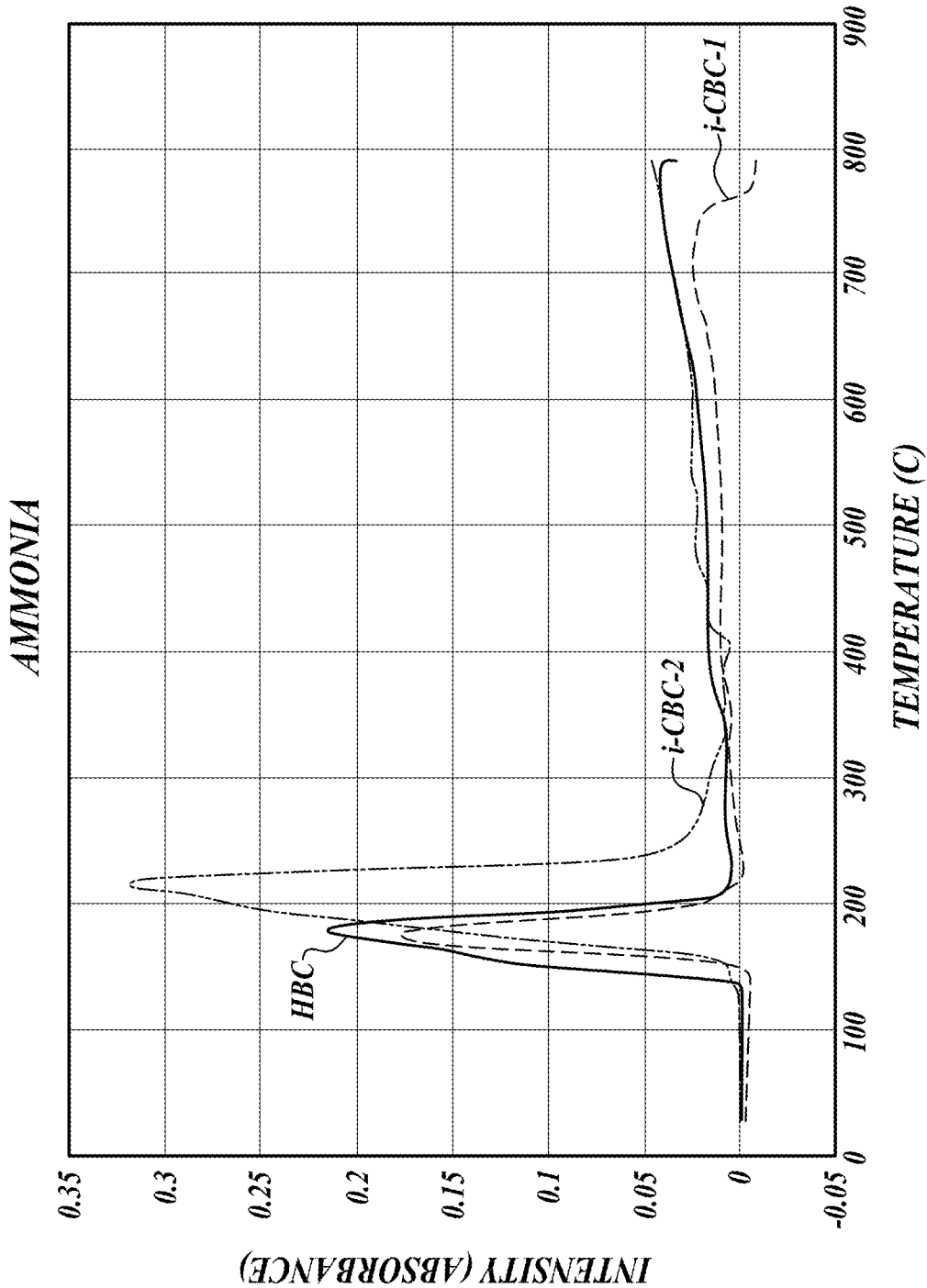
FIG. 3 is a graph of urea decomposition for embodiments of binary catalysts of the present disclosure.

The resulting binary catalysts provide multifunctional properties to the UH-SCR component, with little electrical power requirement. For example, as shown in FIG. 3, urea decomposes at below 190° C. for embodiments of HBC and i-CBC, with no detected urea deposit.

The binary catalyst of the present disclosure is both an effective urea hydrolysis and SCR catalyst. With the catalyst, urea can be hydrolyzed in one step without requiring a 3-step process including evaporation of water, thermolysis, followed by hydrolysis. Thus, diesel exhaust fluid (DEF) sprayed (e.g., dosed) directly onto a combined urea hydrolysis-SCR (UH-SCR) catalytic core achieves ammonia production in one step, at temperatures much lower than that required for urea thermolysis. The hydrolysis of urea is shown in the equation below.

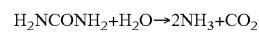

$$H_2NCONH_2 + H_2O \rightarrow 2NH_3 + CO_2$$

Furthermore, with the present aftertreatment catalytic system, soot in the engine exhaust passively oxidizes to decrease and/or avoid clogging and blinding of the catalytic sites and reduces particle number in emissions. The binary catalysts can enable passive soot oxidation when used in a SCRF, with enhanced ammonia storage. In some embodiments, the binary catalysts can decrease particle number in emissions (e.g., when compared to conventional aftertreatment systems), by virtue of the passive soot oxidation capability of the catalyst (e.g., the i-CBC and/or the HBC). Performance benefits can also be observed when such binary catalysts are in SCRF and SCR catalyst configurations. In some embodiments, high EO $NO_x$ can be achieved, thereby allowing high engine operation to achieve higher fuel economy and lower $CO_2$ emissions (e.g., when compared to conventional aftertreatment systems). Therefore, the UH-SCR of the present disclosure is important in providing a low cost, easy to operate, and compact aftertreatment for achieving ultra-low NOx targets.

When coated onto an electrically heated catalyst substrate (e.g., a metallic catalyst substrate), the binary catalysts can achieve ULN targets by dosing DEF directly on to the UH-SCR, starting NOx reduction within the first 60 seconds of cold start. With sufficient power applied for rapid heat-up and sufficient catalyst volume, the UH-SCR converts the cold start EO NOx at relatively low temperatures using stored ammonia and ammonia produced by the urea decomposition reaction shown the equation above. Thus, the UH-SCR dramatically reduces engine-out NOx (EO NOx), before the larger SCR or SCRF catalysts attain their optimal lightoff temperature.

Intra-Crystalline Binary Catalysts

The intra-crystalline binary catalyst compositions can include a primary catalyst (e.g., a (metal) zeolite) having a crystal lattice (e.g., a (metal) zeolite's crystal lattice) that incorporates a secondary catalyst (e.g., a metal oxide), wherein the secondary catalyst is covalently bound to elements within the crystal lattice of the primary catalyst. In an intra-crystalline binary catalyst, the secondary catalyst forms an integral part of the primary catalyst's crystal lattice, forming covalent bonds with at least the Si or Al atoms within the crystal lattice of the primary catalyst, and is dispersed throughout the primary catalyst's crystal lattice. The secondary catalyst can substitute atoms within the crystal lattice of the primary catalyst. The catalyst composition is also referred to herein as an intra-crystalline binary catalyst (i-CBC).

The iCBC catalyst compositions can enhance ammonia storage and low temperature $NO_x$ reduction, and provide other beneficial catalytic properties, discussed below. When the catalyst composition is loaded with a metal, such as copper or iron, in addition to the metal oxide serving as a sink for "mopping up" or scavenging reactive metal species (e.g., CuO) released from the (metal) zeolite framework (e.g., due to hydrothermal aging), excess metal (e.g., copper or iron) in the catalyst composition do not become located at the desired $Al_2O_3$ sites of the (metal) zeolite, which have $NO_x$ reduction catalytic activity, thereby providing enhanced hydrothermal stability compared to physical mixtures of (metal) zeolite and metal oxide, or hybrid binary catalysts including (metal) zeolite and metal oxide covalently bound to the surface of the (metal) zeolite.

The catalyst compositions can have ≥1% by weight metal oxide within the (metal) zeolite crystal lattice itself (e.g., an SSZ-13 chabazite crystal lattice) and about double the conventional alumina content of the zeolite. When loaded with copper cations, the catalyst compositions exhibit improved $NO_x$ reduction and ammonia storage, while showing little to no increase in $N_2O$ produced (partially) from ammonia oxidation.

Figure 4:
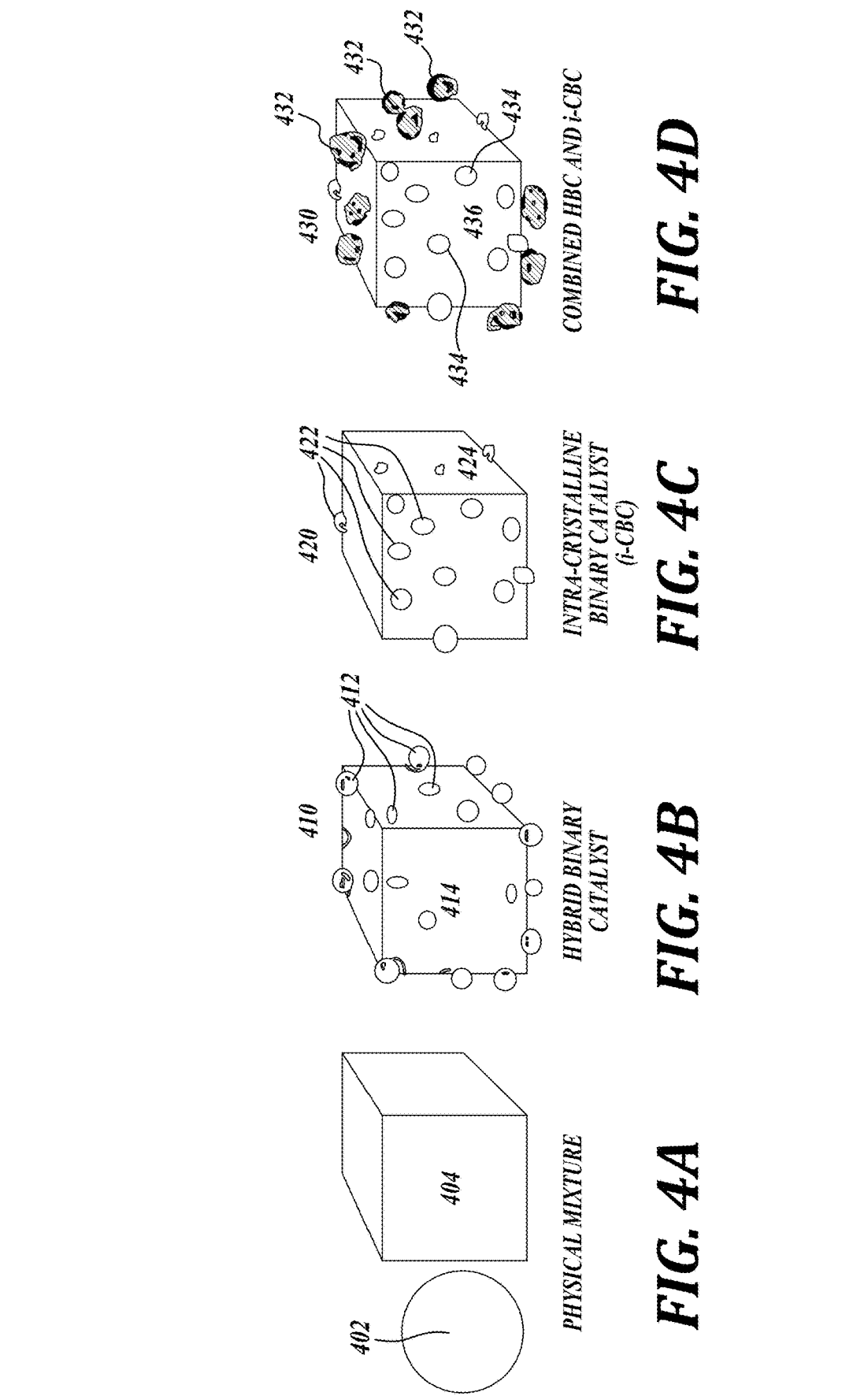
FIG. 4A is an illustration of a physical mixture of (metal) zeolite and metal oxide.
FIG. 4B is an illustration of a hybrid binary catalyst.
FIG. 4C is an illustration of an intra-crystalline binary catalyst of the present disclosure.
FIG. 4D is an illustration of an embodiment of an intra-crystalline binary catalyst of the present disclosure having additional metal oxides nanoparticles covalently bound to the surface of the (metal) zeolite.

FIGS. 4A-4C schematically illustrates the structural differences between a physical mixture of metal oxides with a (metal) zeolite (FIG. 4A), a hybrid binary catalyst (FIG. 4B), and the intra-crystalline binary catalyst compositions (FIG. 4C). FIG. 4A shows a physical mixture of metal oxides 402 with (metal) zeolites 404, where both are micron sized and exist as separate particles that are physically mixed with one another. FIG. 4B shows a hybrid binary catalyst 410, where small metal oxide nanoparticles 412 are covalently attached to the surface of larger (metal) zeolite particles 414. FIG. 4C is an illustration of the intra-crystalline catalyst composition 420, where nanoparticles of metal oxides 422 are covalently incorporated into and throughout the crystal lattice of (metal) zeolite 424. FIG. 4D is a combination of a hybrid binary catalyst 430 and an intra-crystalline binary catalyst composition, and thus also includes an intra-crystalline binary catalyst composition. In FIG. 4D, metal oxide nanoparticles 432 are covalently attached to the surface of the (metal) zeolite particles 436 and metal oxide nanoparticles 434 are also covalently bound throughout the crystal lattice of the (metal) zeolite's crystal framework. The composition of the metal oxide nanoparticles 432 and 434 can be the same, or different.

Intra-Crystalline Binary Catalyst Compositions

The intra-crystalline binary catalyst compositions can include specific chemical elements that possess the desired electronegativities for various chemical reactions that occur in an engine aftertreatment system. In some embodiments, the catalyst compositions include Y (yttrium), Mn (manganese), V (vanadium), Ce (Cerium), Co (cobalt), and/or Fe (iron).

As discussed above, in general, the intra-crystalline binary catalyst compositions include a primary catalyst that can be a particle having a crystal lattice, and a secondary catalyst. The secondary catalyst is covalently bound and dispersed throughout the crystal lattice of the primary catalyst, and can be found occupying the lattice sites otherwise occupied by atoms from the primary catalyst. In some embodiments, the primary catalyst is a (metal) zeolite. The (metal) zeolite has a plurality of metal oxide secondary catalyst nanoparticles dispersed within its crystal lattice. In some embodiments, referring to FIG. 4D, the intra-crystalline binary catalyst compositions are a combination of a hybrid binary catalyst and an intra-crystalline catalyst composition, where metal oxide nanoparticles 432 are covalently attached to the surface of the (metal) zeolite particles 436 and metal oxide nanoparticles 434 are also covalently bound throughout the crystal lattice of the (metal) zeolite's crystal framework.

The well-dispersed secondary catalyst provides highly reactive catalytic sites that can operate in a synergistic manner with the primary catalyst. For example, the secondary catalyst (e.g., a metal oxide) can adsorb NO and rapidly convert the NO to $NO_2$, which reacts in the presence of $NH_3$ on an adjoining primary catalyst site (e.g., a (metal) zeolite) to produce $N_2$. Because the secondary catalyst is throughout the crystal lattice of the (metal) zeolite, a large number of catalytically active sites can be provided, with enhanced catalytic activity.

Without wishing to be bound by theory, it is believed that the intra-crystalline binary catalyst compositions provide different types of active sites that are located in close proximity to one another within the (metal) zeolite. The different types of active sites can provide combined catalytic functionalities, faster reaction kinetics, synergy for high performance catalyst activity, and/or improved catalyst durability. Without wishing to be bound by theory, it is believed that faster reaction kinetics result from the increased number and close proximity of the catalyst active sites in the intra-crystalline binary catalyst compositions, such that multiple catalytic reactions can occur in close proximity to one another both in time and space.

Without wishing to be bound by theory, it is believed that improved catalyst durability can be achieved with an intra-crystalline binary catalyst due to combination of properties of the components of the catalyst. For example, a highly oxidative secondary catalyst can be combined with a high temperature-tolerant primary catalyst in an appropriate ratio to achieve an intra-crystalline binary catalyst that has both high oxidative properties and temperature tolerance.

Without wishing to be bound by theory, it is believed that the primary and secondary catalysts can act in synergy with respect to one another when catalyzing the decomposition of exhaust gases, where the primary and secondary catalysts can both participate in a redox reaction, with one catalyst acting as a reducing agent (e.g., an anode) and the other catalyst acting as an oxidizing agent (e.g., a cathode). The redox reaction is a spontaneous and self-perpetuating process that occurs at adjacent active sites, where mass transfer limitations are minimal due to the close proximity of the active sites in a crystal lattice. The intra-crystalline binary catalyst components can be selected to possess ion exchange/binding properties to enable ion transport between sites. For example, doping of $ZrO_2$ with $Y^{3+}$ cationic dopant creates lattice vacancies that permit $O^{2-}$ transport through the (metal) zeolite crystal lattice.

In some embodiments, the intra-crystalline binary catalyst compositions have a primary catalyst that is loaded (e.g., by ion exchange reactions) with one or more metal cations, in particular Cu and Fe cations, to provide a metal zeolite. As used here, "metal zeolite" refers to a zeolite that has been loaded with Cu or Fe cations. In some embodiments, the primary catalyst includes an aluminosilicate zeolite.

In some embodiments, the intra-crystalline binary catalysts are substantially free of alkali metal ions, such as $Na^+$ and K⁺. For example, use of a 28% NH₃ aqueous solution or a 1M NH₄NO₃ aqueous solution at an elevated temperature during the synthesis of the intra-crystalline binary catalysts can extract Na or K cations. Without wishing to be bound by theory, it is believed that in some embodiments, the presence of Na or K cations can adversely impact aging of the intra-crystalline catalyst.

In certain embodiments, the one or more zeolite does not include any cations.

In some embodiments, the intra-crystalline binary catalyst compositions include from 0.5 wt % (e.g., from 1 wt %, from 10 wt %, from 20 wt %, from 30 wt %, from 40 wt %, from 50 wt %, from 60 wt %, from 70 wt %, from 80 wt %, from 85 wt %, from 90 wt %, from 95 wt %, from 97.5 wt %, from 98 wt %, from 98.5 wt %, from 99 wt %, from 99.5 wt %) to 99.9 wt % (e.g., to 99.5 wt %, to 99 wt %, to 98.5 wt %, to 98 wt %, to 97.5 wt %, to 95 wt %, to 90 wt %, to 80 wt %, to 70 wt %, to 60 wt %, to 50 wt %, to 40 wt %, to 30 wt %, to 20 wt %, to 10 wt %, or to 1 wt %) of the one or more (metal) zeolites. The intra-crystalline binary catalyst can have a structure shown in FIG. 4D, where a combination of a hybrid binary catalyst 430 and an intra-crystalline catalyst composition has metal oxide nanoparticles covalently attached to the surface of the (metal) zeolite particles and metal oxide nanoparticles also covalently bound throughout the crystal lattice of the (metal) zeolite's crystal framework.

In certain embodiments, the intra-crystalline binary catalyst compositions include from 90 wt % to 99.9 wt % (e.g., from 95 wt % to 99.9 wt %, from 97.5 wt % to 99.9 wt %, from 98 wt % to 99.9 wt %, from 99 wt % to 99.9 wt %, from 99.5 wt % to 99.9 wt %, from 95 wt % to 99 wt %, from 97.5 wt % to 99 wt %, or from 98 wt % to 99 wt %) of the one or more (metal) zeolites. The intra-crystalline binary catalyst can have a structure shown in FIG. 4C, where nanoparticles of metal oxides are covalently incorporated into and throughout the crystal lattice of (metal) zeolite.

In some embodiments, the metal zeolite is a Fe-loaded aluminosilicate zeolite, a Cu-loaded aluminosilicate zeolite, and/or a Fe- and Cu-loaded aluminosilicate zeolite. In certain embodiments, the metal zeolite is a Fe-loaded chabazite, a Cu-loaded chabazite, and/or a Fe and Cu-loaded chabazite. In certain embodiments, the metal zeolite is a Fe- and/or Cu-loaded aluminosilicate zeolite. In some embodiments, the (metal) zeolite includes SSZ-13 chabazite and/or other aluminosilicate zeolites having SSZ-type zeolite structures. In certain embodiments, the (metal) zeolite includes a chabazite. In certain embodiments, the (metal) zeolite includes SSZ-13 and/or other thermally durable zeolites having good thermal resistance. In some embodiment, the (metal) zeolite includes silicon and aluminum, and is a small pore zeolite having maximum pore diameter of less than or equal to 5 angstroms.

The zeolite or the metal zeolite can have a Si/Al ratio of 2 or more (e.g., 4 or more, 6 or more, 8 or more, 10 or more, 12 or more, 15 or more, or 20 or more) and/or 25 or less (e.g., 20 or less, 15 or less, 12 or less, 10 or less, 8 or less, 6 or less, or 4 or less). In some embodiments, the zeolite or the metal zeolite has a Si/Al ratio of from 2 to 12 (e.g., from 2 to 10, from 2 to 8, from 6 to 12, from 6 to 10, or from 8 to 10). In some embodiments, the Si/Al ratio is from 10 to 20 (e.g., from 12 to 20, from 14 to 20, from 16 to 20, or from 18 to 20). The Si/Al ratio can provide an intra-crystalline binary catalyst with good durability.

In certain embodiments, the intra-crystalline binary catalyst can be mesoporous, having a porosity of greater than or equal to 0.3 cm³/g (e.g., greater than 0.33 cm³/g, greater than 0.35 cm³/g, greater than 0.4 cm³/g, or greater than 0.5 cm³/g) and/or less than or equal to 0.6 cm³/g (less than or equal to 0.5 cm³/g, less than or equal to 0.4 cm³/g, less than or equal to 0.35 cm³/g, or less than or equal to 0.33 cm³/g). The porosity of the intra-crystalline binary catalyst can be determined by BET surface area measurement.

In some embodiments, the intra-crystalline binary catalyst compositions have a secondary catalyst that includes one or more metal oxides. The metal oxides can be in the form of nanoparticles, having a maximum dimension of from 0.1 nm (e.g., from 0.5 nm, from 1 nm, from 2 nm, from 3 nm, or from 4 nm) to 5 nm (e.g., to 4 nm, to 3 nm, to 2 nm, to 1 nm, or to 0.5 nm). In certain embodiments, the metal oxides in the form of nanoparticles have a maximum dimension of from 1 nm to 5 nm (e.g., from 1 nm to 4 nm, from 2 nm to 5 nm, from 3 nm to 5 nm; or about 3 nm). The secondary catalyst can be imaged via electron microscopy, and can be discrete nanoparticles dispersed throughout the crystal lattice of the primary catalyst. The secondary catalyst can be covalently bound to the (metal) zeolite's crystal lattice. For example, the secondary catalyst can be covalently bound to the Si atoms in the (metal) zeolite's crystal lattice. In some embodiments, the secondary catalyst occupies the sites corresponding to aluminum in the (metal) zeolite's crystal lattice. The intra-crystalline binary catalyst can have a structure shown in FIG. 4C, where nanoparticles of metal oxides are covalently incorporated into and throughout the crystal lattice of (metal) zeolite.

In some embodiments, the intra-crystalline binary catalyst compositions have a secondary catalyst that includes one or more metal oxides in the form of nanoparticles, having a maximum dimension of from 0.1 nm (e.g., from 1 nm, from 5 nm, from 10 nm, from 20 nm, from 30 nm, or from 40 nm) to 50 nm (e.g., to 40 nm, to 30 nm, to 20 nm, to 10 nm, to 5 nm, or to 1 nm). The intra-crystalline binary catalyst can have a structure shown in FIG. 4D, where a combination of a hybrid binary catalyst and an intra-crystalline catalyst composition has metal oxide nanoparticles covalently attached to the surface of the (metal) zeolite particles and metal oxide nanoparticles also covalently bound throughout the crystal lattice of the (metal) zeolite's crystal framework. The metal oxide nanoparticles within a (metal) zeolite matrix can have a maximum dimension of from 1 nm to 5 nm (e.g., from 1 nm to 4 nm, from 2 nm to 5 nm, from 3 nm to 5 nm; or about 3 nm).

The one or more metal oxides of the secondary catalyst of the intra-crystalline binary catalyst compositions can include, for example, cerium oxide, titanium oxide, zirconium oxide, aluminum oxide, silicon oxide, hafnium oxide, vanadium oxide, niobium oxide, tantalum oxide, chromium oxide, molybdenum oxide, tungsten oxide, iridium oxide, nickel oxide, barium oxide, yttrium oxide, scandium oxide, calcium oxide, ferric oxide, manganese oxide, lanthanum oxide, strontium oxide, cobalt oxide, copper oxide, iron oxide, and/or any combination thereof. In some embodiments, the one or more metal oxides of the intra-crystalline binary catalyst compositions are zirconium oxide, vanadium oxide, cerium oxide, manganese oxide, chromium oxide, cobalt oxide, titanium oxide, tungsten oxide, barium oxide, and/or any combination thereof. In certain embodiments, the one or more metal oxides of the intra-crystalline binary catalyst compositions include zirconia, ceria, vanadia, chromium oxide, barium oxide and niobium oxide. In some embodiments, the one or more metal oxides of the intra-crystalline binary catalyst compositions include lanthanum oxide, strontium oxide, cobalt oxide, and/or iron oxide.

In some embodiments, the catalyst compositions can have from 0.5 wt % (e.g., from 1 wt %, from 10 wt %, from 20 wt %, from 30 wt %, from 40 wt %, from 50 wt %, from 60 wt %, from 70 wt %, from 80 wt %, or from 90 wt %) to 99.5 wt % (e.g., to 90 wt %, to 80 wt %, to 70 wt %, to 60 wt %, to 50 wt %, to 40 wt %, to 30 wt %, to 20 wt %, to 10 wt %, or to 1 wt %) of the one or more metal oxide secondary catalysts. As used herein, a recited ranges includes the end points, such that from 0.5 wt % to 99.5 wt % includes both 0.5 wt % and 99.5 wt %. The intra-crystalline binary catalyst can have a structure shown in FIG. 4D, where a combination of a hybrid binary catalyst 430 and an intra-crystalline catalyst composition has metal oxide nanoparticles covalently attached to the surface of the (metal) zeolite particles and metal oxide nanoparticles also covalently bound throughout the crystal lattice of the (metal) zeolite's crystal framework.

In certain embodiments, the intra-crystalline binary catalyst compositions include 0.05 wt % or more (e.g., 0.1 wt % or more, 0.5 wt % or more, 1 wt % or more, 1.5 wt % or more, 3 wt % or more, or 4 wt % or more) and/or 5 wt % or less (e.g., 4 wt % or less, 3 wt % or less, 1.5 wt % or less, 1 wt % or less, 0.5 wt % or less, or 0.1 wt % or less) of the secondary catalyst that includes one or more metal oxides. In certain embodiments, the intra-crystalline binary catalyst compositions include 0.05 wt % or more (e.g., 0.1 wt % or more, 0.5 wt % or more, 1 wt % or more, 1.5 wt % or more, or 1.75 wt % or more) and/or 2 wt % or less (e.g., 1.75 wt % or less, 1.5 wt % or less, 1 wt % or less, 0.5 wt % or less, or 0.1 wt % or less) of the secondary catalyst that includes one or more metal oxides. In some embodiments, the intra-crystalline binary catalyst compositions include from 0.05 wt % to 2 wt % (e.g., 0.1 to 2 wt %, 0.1 to 1.75 wt %, 0.1 to 1.5 wt %, 0.1 to 1 wt %, 0.1 to 0.5 wt %, 0.25 wt % to 2 wt %, 0.5 wt % to 2 wt %, 0.75 wt % to 2 wt %, 1.0 wt % to 2 wt %, 1.25 wt % to 2 wt %, or 1.5 wt % to 2 wt %) of the secondary catalyst that includes one or more metal oxides. The intra-crystalline binary catalyst can have a structure shown in FIG. 4C, where nanoparticles of metal oxides are covalently incorporated into and throughout the crystal lattice of (metal) zeolite.

In some embodiments, the intra-crystalline binary catalyst compositions further include a cationic dopant. The cationic dopant can be located in the secondary catalyst. In some embodiments, the cationic dopant is found in the secondary catalyst, but not in the primary catalyst. For example, the intra-crystalline binary catalyst compositions can include a cation of Y, Mn, V, Ce, Co, Fe, and any combination thereof. In some embodiments, the cationic dopant can include an oxide that includes $Y^{3+}$, $V^{4+}$, $Mn^{2+}$, $Fe^{3+}$, $Co^{2+}$, $Ce^{4+}$, and any combination thereof. In some embodiments, the improvements to $NH_3$ storage and $N_2O$ make of the cationic dopants can be ranked in the order of Y>Mn>V>Ce>Co>Fe. In some embodiments, the cationic dopant can be in the form of an oxide, and/or in the form of dopants in the intra-crystalline binary catalyst compositions. As discussed above, the cationic dopant can be located in the secondary catalyst. In some embodiments, the cationic dopant is found in the secondary catalyst, but not in the primary catalyst. In some embodiments, when in the form of dopants, the dopant cation is achieved by incipient wetness impregnation and is bound by the anion exchange characteristics of the metal oxide. The cationic dopant can be present in the intra-crystalline binary catalyst at a concentration of 0.01 wt % or more (e.g., 0.1 wt % or more, 1 wt % or more, 2 wt % or more, 3 wt % or more, 4 wt % or more, 5 wt % or more, or 6 wt % or more) and/or 7 wt % or less (e.g., 6 wt % or less, 5 wt % or less, 4 wt % or less, 3 wt % or less, 2 wt % or less, 1 wt % or less, or 0.1 wt % or less), relative to the whole of the intra-crystalline binary catalyst. In some embodiments, the cationic dopant is present in the intra-crystalline binary catalyst at a concentration of 0.01 wt % or more (e.g., 0.1 wt % or more, 0.5 wt % or more, 1 wt % or more, 1.5 wt % or more, or 1.75 wt % or more) and/or 2 wt % or less (e.g., 1.75 wt % or less, 1.5 wt % or less, 1 wt % or less, 0.5 wt % or less, or 0.1 wt % or less), relative to the whole of the intra-crystalline binary catalyst.

The intra-crystalline binary catalyst compositions can have adjustable compositions. For example, the composition can be changed by adjusting an oxidative power to address the tradeoff between $NO_x$ reduction performance and durability. In some embodiments, the optimal composition can be determined for each metal oxide of the secondary catalyst. In some embodiments, the one or more metal oxides of the secondary catalyst of the intra-crystalline binary catalyst compositions are $CeO_2:ZrO_2$ (i.e., a mixture of $CeO_2$ and $ZrO_2$ having, for example, from 40 wt % to 60 wt % $CeO_2$, $Y_2O_3:CeO_2$ (i.e., a mixture of $Y_2O_3$ and $CeO_2$, where, in some embodiments, has about 10 wt % of $Y_2O_3$), $Zr_{0.8}Sr_{0.2}CoO_3$, Zr oxides (e.g., $ZrO_2$), $Y_2O_3:ZrO_2$, and/or $ZrV_2O_7$. In some embodiments, the metal oxide of the secondary catalyst in the intra-crystalline binary catalysts is $ZrO_2$, $Y_2O_3:ZrO_2$, $ZrV_2O_7$, and/or $CeO_2:ZrO_2$. In certain embodiments, while $CeO_2$ has higher oxidative power, $ZrO_2$ is selected instead as the secondary catalyst based upon both durability consideration and its ability to be modified by doping with strong oxidizing species (such as $Mn_3O_4$, $CoO_3$, $V_2O_7$, $CrO_3$, $Fe_3O_4$, any combination thereof, and the like).

In some embodiments, the intra-crystalline binary catalyst compositions do not include a cationic dopant. In some embodiments, the catalyst composition consists of a (metal) zeolite including metal oxide and a cationic dopant. In certain embodiments, the catalyst composition consists of a (metal) zeolite and a metal oxide. In some embodiments, the one or more metal oxides do not include a cationic dopant. In some embodiments, the secondary catalyst consists of a metal oxide including a cationic dopant. In certain embodiments, the secondary catalyst consists of a metal oxide.

The intra-crystalline binary catalyst compositions can have a variety of desirable properties. For example, the intra-crystalline binary catalyst compositions can have a thermal resistance of up to 600° C. As used herein, "thermal resistance" refers to the ability of a catalyst to retain catalytic activity even with repeated exposure of up to 600° C. over an extended period of time (e.g., 100 hours or more). In some embodiments, a standard accelerated aging test includes hydrothermal aging studies at 800° C. for 16 hours in 8% water vapor.

The intra-crystalline binary catalyst compositions can offer combinations of desirable catalytic properties. For example, a SCR catalyst including Cu and/or Fe-loaded zeolite-based catalyst compositions having one metal oxide in the crystal lattice of the metal zeolite can be additionally modified with a selective catalytic oxidation (SCO) catalyst by impregnation of an applied washcoat using an appropriate precursor solution (such as zirconium(IV) oxynitrate hydrate), without the need to mix separate SCR and SCO particles. High SCR:SCO ratios can be achieved with equivalent or higher SCO surface area for enhanced $NH_3$ storage capacity with a lower mass of metal oxide, compared to that for a physical mixture of primary and secondary catalyst particles or hybrid binary catalysts.

In some embodiments, the intra-crystalline binary catalyst compositions convert $NO_x$ at an efficiency of greater than or equal to 80% (e.g., greater than or equal to 85%, greater than or equal to 90%, or greater than or equal to 95%) at 200° C., and/or oxidizes soot at an efficiency of greater than or equal to 10% (e.g., greater than or equal to 20%, greater than or equal to 25%, or greater than or equal to 30%) at steady state, at a temperature of less than or equal to 200° C. The catalyst composition has an ammonia storage capacity of 1.5 g/L or more (e.g., 2 g/L or more, 3 g/L or more, 4 g/L or more, 5 g/L or more, or 6 g/L or more) and/or 7 g/L or less (e.g., 6 g/L or less, 5 g/L or less, 4 g/L or less, 3 g/L or less, or 2 g/L or less) at 100° C. The catalyst composition can produce oxygen gas while reducing emission of CO, NO, $NO_2$, $N_2O$, hydrocarbons (e.g., volatile organic compounds, "VOC"), sulfur-containing gases, soot, urea, ammonia, or any combination thereof. In some embodiments, the catalyst composition has an ammonia storage capacity of 2 g/L or more and/or 7 g/L or less (e.g., 2.5 g/L or more and/or 7 g/L or less, or 3 g/L or more and/or 7 g/L or less). Without wishing to be bound by theory, it is believed that by incorporating metal oxide nanoparticles into the (metal) zeolite's crystal lattice, the overall hydrophilicity of the resulting intra-crystalline binary catalyst composition is decreased compared to a catalyst having the same elemental composition in the same proportions, but where metal oxide nanoparticles have not been incorporated into the crystal lattice of a host (metal) zeolite. The decreased hydrophilicity contributes to the dramatically improved ammonia storage of the intra-crystalline binary catalyst compositions, when compared, for example, to a hybrid binary catalyst that has the same metal oxide and (metal) zeolite elemental compositions and proportion, as it is believed that water competes with ammonia for binding sites in the catalyst compositions. Thus, by decreasing hydrophilicity of the catalyst compositions, less water is taken up by the catalyst compositions, and more ammonia can be stored in the catalyst compositions. The decreased hydrophilicity also contributes to the increased soot oxidation efficiency of the intra-crystalline binary catalyst compositions, when compared, for example, to a hybrid binary catalyst that has the same metal oxide and (metal) zeolite elemental compositions and proportions.

The intra-crystalline binary catalyst compositions can have tailored cold start and cold FTP cycle performance. Without wishing to be bound by theory, it is believed that the decreased hydrophilicity of the catalytic compositions leads to faster water evaporation and catalyst heat-up, thereby dramatically shortening the cold start period (during which untreated emissions can be released into the environment). As used herein, cold start conditions refer to the first 600 seconds after key-on as the temperature of the aftertreatment increases to achieve the optimal 350-450° C. range for $NO_x$ reduction. As used herein, an "FTP cycle" refers to an EPA Federal Test Procedure, commonly known as FTP-75 for a city driving cycle.

In some embodiments, the intra-crystalline binary catalyst compositions have a BET surface area of 450 m²/g or more (e.g., 500 m²/g or more, 550 m²/g or more, or 600 m²/g or more) and/or 650 m²/g or less (e.g., 600 m²/g or less, 550 m²/g or less, or 500 m²/g or less). In some embodiments, the intra-crystalline binary catalyst compositions have a BET surface area of 500±50 m²/g. In some embodiments, the intra-crystalline binary catalyst compositions have a median pore diameter of about 5-6 Å. The pore diameter can be obtained by BET measurements. Without wishing to be bound by theory, it is believed that intra-crystalline binary catalyst compositions with a large BET surface area has greater catalytic activity compared to an intra-crystalline binary catalyst composition with a smaller BET surface area.

In some embodiments, the intra-crystalline binary catalyst compositions have increased catalytic activity compared to a corresponding hybrid binary catalyst or a physical mixture of primary and secondary catalysts.

An intra-crystalline binary catalyst-based urea hydrolysis catalyst can have the same composition as an intra-crystalline binary catalyst-based SCR catalyst, or has a reversed ratio of zeolite-to-metal oxide, for example, when the outer surfaces of the intra-crystalline binary catalyst is also hybridized with metal oxide nanoparticles in a combined i-CBC/HBC configuration (e.g., FIG. 4D). In certain embodiments, the urea hydrolysis catalyst is applied to the surface of an impact static mixer and has a $NO_x$ conversion efficiency of 10% or more (e.g., 25% or more, 40% or more, 55% or more, or 70% or more) and/or 80% or less (e.g., 70% or less, 55% or less, 40% or less, or 25% or less).

Catalyst Washcoat Procedure:

A washcoat slurry including the following can be used to coat a catalytic substrate (e.g., a metallic catalytic substrate), which can first be surface roughened by abrasion, degreased with isopropanol and washed with deionized water: intra-crystalline binary catalyst, deionized water; optionally lactic acid; poly(ethylene glycol-ran-propylene glycol) (e.g., having a molecular weight $M_n$ of about 2,500); poly(ethylene oxide) (e.g., having a molecular weight $M_v$ of about 300,000). Following mixing or milling (such as milling using a roller mill apparatus), the washcoat slurry can be cooled to room temperature and applied to a substrate, such as a catalytic substrate and/or a metallic mixer. After drying for a period of 8-12 hours in air, the coated substrate can be dried in an air oven at about 100-120° C. A second coating can be optionally applied, and the coated substrate can be calcined (e.g., for 1 hr at about 450-650° C.). Relative durability of the coating can be determined by weighing before and after applying a blast of $N_2$ at 70 psig.

In some embodiments, the catalyst-coated catalytic substrate (e.g., an EHC) is pretreated at 950° C. for 30 hours to enable aluminum to migrate to the surface and form aluminum oxide, which can facilitate washcoat adhesion.

In some embodiments, the intra-crystalline catalyst can bind and oxidize SCR catalyst poisons, such as hydrocarbons, sulfur, phosphorus, or a combination thereof. In some embodiments, the intra-crystalline catalyst can be regenerated.

Intra-Crystalline Catalyst Synthesis

The intra-crystalline binary catalyst composition that is used for the metal cation-loading can be made by providing a reaction mixture of zeolite precursors (e.g., silica, alumina), with an organic templating agent. The reaction mixture for making the intra-crystalline binary catalyst can further include one or more seed catalysts, such as a hybrid binary catalyst described in U.S. application Ser. Nos. 15/612,815 and 15/612,833, filed Jun. 2, 2017, each incorporated herein by reference in its entirety, and precursors to the metal oxide.

A general example of the synthesis of intra-crystalline catalyst compositions is as follows:

(1) Dissolve an amount of base, such as sodium hydroxide, in deionized water. Rapidly add a solution of a metal oxide precursor with vigorous stirring. The metal oxide nanoparticles can form instantly.

(2) A templating agent can be added, followed by the reagents for the zeolite (e.g., alumina and fumed silica).

(3) The contents were well mixed and transferred to a Teflon lined high pressure reactor, and incubated at 160° C. for the prescribed reaction time of between 168 to 336 hours.

An HBC can be added as a seeding agent. For example, the seeding HBC can include HBC containing Zr/Mo, Zr/Ce, Zr/Cr, Zr/W, Ce/La, Zr/Ba/La, Zr/Mn, Zr/Ti, Zr/Co, Zr/Ni, Zr/V, Zr/Nb, Zr/Cu, Zr only and/or Zr/La.

In some examples, the incubation can occur at a temperature of 150° C. or more (e.g., 160° C. or more, or 165° C. or more) and/or 170° C. or less (e.g., 165° C. or less, or 160° C. or less) for a duration of less than 1 day and/or up to 6 days or more (e.g., 10 days or more, 14 days or more, or 16 days or more) and/or 20 days or less (e.g., 16 days or less, 14 days or less, or 10 days or less) (each day is 24 hours). The synthesized intra-crystalline binary catalyst can then be isolated from the reaction mixture by filtration. The isolated intra-crystalline binary catalyst can be optionally air-dried, and calcined in air at 550° C. or more (e.g., 575° C. or more, or 600° C. or more) to 620° C. or less (e.g., 600° C. or less, or 575° C. or less) for a duration of 3 hours or more and/or 5 hours or less (e.g., a duration of about 4 hours). After calcining, the proton form of the intra-crystalline binary catalyst can be obtained by conducting an ammonium-ion exchange procedure, followed by calcining. The proton form of the intra-crystalline binary catalyst can be loaded with a metal cation by treating the zeolite with a solution containing the metal cation precursor (e.g., in the form of a metal salt) in the presence of a basic ammonia solution. Examples of metal cation precursor salts include copper nitrate, copper sulfate, ferric nitrate, and any combination thereof.

The zeolite precursors can include, for example, silica ($SiO_2$), alumina ($Al_2O_3$), fumed silica, fumed alumina, silica gel, and/or ammonium hexafluorosilica. The reaction mixture can include a Si/Al ratio of 2 or more (e.g., 5 or more, 8 or more, 11 or more, 14 or more, or 16 or more) and/or 20 or less (e.g., 16 or less, 14 or less, 11 or less, 8 or less, or 5 or less). In some embodiments, the zeolite precursor includes silica and alumina at a weight ratio of 10:3 or more (e.g., 20:3 or more, 40:3 or more, 60:3 or more, or 80:3 or more) and/or 100:3 or less (e.g., 80:3 or less, 60:3 or less, 40:3 or less, or 20:3 or less). In some embodiments, the silica to alumina weight ratio is 50:5. The concentration of Si in the reaction mixture can be 20 wt % or more and/or 40 wt % or less (e.g., from 20 wt % to 40 wt %). The concentration of Al in the reaction mixture can be 3 wt % or more and/or 40 wt % or less (e.g., from 3 wt % to 40 wt %).

The reaction mixture can further include a solvent, such as water.

The organic templating agent includes, for example, trimethyladamantylammonium hydroxide, trimethyl-1-adamantylammonium iodide, copper tetraethylenepentamine, tricyclodecane, copper diethylenetriamine, N1-butyl-N4-docosyl-N1,N1,N4,N4-tetramethylbutane-1,4-diaminium dibromide, and/or 3-azoniabicyclo[3.2.1]octane. The organic templating agent can be present in the reaction mixture at a concentration of 3% or more (e.g., 5% or more, 10% or more) and/or 30% or less.

In some embodiments, the organic templating agent includes, for example, hexamethonium 1-methyl-1-alkylpyrrolidinium, 1-methyl-1-alkylpiperidinium, and N,N-diethyl-5,8-dimethyl 1-2-azonium dications, trimethylphenylammonium hydroxide and mixtures thereof, for producing various small pore zeolite framework structures of this disclosure, such as SSZ-13, SSZ-112 and SSZ-52, SSZ-62, and SSZ-98.

The seed catalyst can be, for example, a hybrid binary catalyst having the same elements as the desired intra-crystalline binary catalyst composition. The seed catalyst can be present in the reaction mixture at a concentration of 0.5 wt % or more (e.g., 1 wt % or more, 1.5% wt % or more, 5 wt % or more, 10 wt % or more, 15 wt % or more, 20 wt % or more, 30 wt % or more) and/or 40 wt % or less (e.g., 30 wt % or less, 20 wt % or less, 15 wt % or less, 10 wt % or less, 5 wt % or less, 1.5 wt % or less, or 1 wt % or less).

The metal oxide precursors can include, for example zirconium oxychloride octahydrate, zirconium oxynitrate hydrate, yttrium chloride, barium nitrate, ferric nitrate, hexammine cobalt (III) chloride, and/or hexammine cobalt (III) chloride. The metal oxide precursors can be present in the reaction mixture at a concentration of 1% or more (e.g., 3 wt % or more, 5% wt % or more, 7.5 wt % or more) and/or 10% or less (e.g., 7.5 wt % or less, 5 wt % or less, or 3 wt % or less).

In some embodiments, formation of zeolite (e.g., SSZ-13) in a reaction mixture for making the intra-crystalline binary catalyst includes an organic templating agent to guide the correct assembly of the Si and Al components of zeolite (e.g., chabazite) framework. An example templating agent is trimethyladamantylammonium hydroxide (TMA). To provide a more rapid reaction, the temperature for the synthesis can be raised. However, at elevated reaction temperatures (e.g., above about 160° C.) in zeolite synthesis, the templating agent can break down, leading to growth of competing denser zeolite phases that are thermodynamically more stable than the desired zeolite phase at higher temperatures. For example, in the synthesis of SSZ-13, formation of denser analcime or quartz can occur at elevated temperatures. An alternative option to elevated temperature to shorten the synthesis time is to add seed crystals of an existing zeolite. Addition of seed crystals can speed up crystallization and/or direct the zeolite crystal growth to a particular structure. Therefore, in some embodiments, the synthesis of the intra-crystalline binary catalyst includes seeding a reaction mixture with a hybrid binary catalyst (e.g., an SSZ-13 based hybrid binary catalyst) to provide preformed catalyst nanoparticles that allow for favorable kinetics for zeolite (e.g., chabazite) structure formation.

To provide a proton form of a silica-rich zeolite component of the intra-crystalline catalyst, such as the SSZ-13-based zeolite, a sodium form of the zeolite is first ion exchanged to the ammonium form. In an exemplary synthetic procedure, 1 gram of the intra-crystalline catalyst is suspended in 100 ml of 1 M $NH_4NO_3$ solution. The solution is subsequently stirred at 80° C. for 2 hours after which the solid product is recovered by filtration and washed with copious amounts of deionized water. After drying the product, the ammonium ($NH_4^+$) exchange procedure is repeated two or three more times, washed with deionized water and air dried to 8-12 hours. The $NH_4$-intra-crystalline catalyst converts to the H-intra-crystalline catalyst by calcination with a temperature ramp of 2° C./min to 600° C. in air, which is then held constant for 4 hours.

Metal Cation Loading Procedure

To convert the proton form of the zeolite material to the copper-loaded form, the vastly accelerated ammonia-facilitated cation loading steps can be carried out. The ammonia-facilitated cation loading steps are described in U.S. application Ser. No. 16/376,980, filed Apr. 5, 2019 and entitled "Ammonia Facilitated Cation Loading of Zeolite Catalysts," the disclosure of which is herein incorporated in its entirety.

Briefly, the metal cation can be loaded into the catalytic composition using the following procedure.

1. A metal cation salt (e.g., copper sulfate) is dissolved in deionized (DI) water, together with the intra-crystalline catalyst, in the appropriate proportions.

2. Heat is applied with vigorous stirring to achieve a predetermined temperature (e.g., 80° C.);

3. At the predetermined reaction temperature, a quantity of aqueous ammonia (e.g. a 28% $NH_3$ aqueous solution) is added to the reaction mixture. Metal cation loading (e.g., copper loading) occurs instantaneously, while the relatively high basic $NH_3$ concentration maintains the metal cation (e.g., $Cu^{2+}$) in solution and decreases the likelihood of CuO crystallite formation. Optionally, continued vigorous stirring and applied heat for a predetermined number of minutes can allow for maximum metal cation loading under the prevailing conditions.

4. The product is cooled in an ice bath, filtered, followed by extensive washing with DI water. This optionally includes washing with a quantity of acidified DI water to tailor the amounts of loaded metal cation (e.g., $Cu^{2+}$) to the optimal desired ion exchange capacity.

5. The metal cation-loaded catalyst is dried at room temperature (RT) for at least 8-12 hours.

6. Calcining the metal cation-loaded catalyst (e.g., for 4 hours at 600° C.).

For the metal cation loading reaction, the metal cation precursor can include, for example, copper sulfate, copper nitrate, and/or ferric nitrate. The metal cation precursor can be present in the ion exchange reaction mixture at a concentration of 0.02 M or more (e.g., 0.1 M or more, 0.3 M or more, 0.5 M or more, or 0.75 M or more) and/or 1M or less (e.g., 0.75 M or less, 0.5 M or less, 0.3 M or less, or 0.1 M or less).

The obtained catalyst compositions can be analyzed by inductively coupled plasma (ICP) spectroscopy to determine elemental composition, X-Ray diffraction (XRD) for crystal structure determination, BET for pore size and surface area determination, and thermogravimetric analysis (TGA) for determining effectiveness of the catalyst in DEF thermolysis, as known to a person of skill in the art. Emissions control capabilities can be determined by a synthetic gas bench (SGB) procedure for 1"×3" core samples, and by on-engine testing behind a 13 L (class 8) diesel engine on a dynamometer.

Without wishing to be bound by theory, it is believed that for the relationship between copper exchange capacity and NOx conversion efficiency for (Si/Al=12) CuSSZ-13: about 30% ion exchange (IE) capacity, or ~2.2 wt % Cu is conventionally considered to be optimal to minimize the negative impact of CuO crystal formation with aging.

Hybrid Binary Catalyst

In some embodiments, hybrid binary catalysts (HBCs) can be used in the UH-SCR catalytic core, where the HBC can coat a catalytic substrate. In general, the HBCs include a primary catalyst that can be a highly porous particle and a secondary catalyst. The secondary catalyst coats the surfaces (e.g., the internal porous surface and/or the external surface) of the primary catalyst. The syntheses described herein of the HBCs provide a primary catalyst whose entire surface, or portions thereof, are coated with discrete and identifiable crystals of the secondary catalyst. The crystals can have a maximum dimension of from 1 to 5 nm.

HBC Structure

Figure 5:
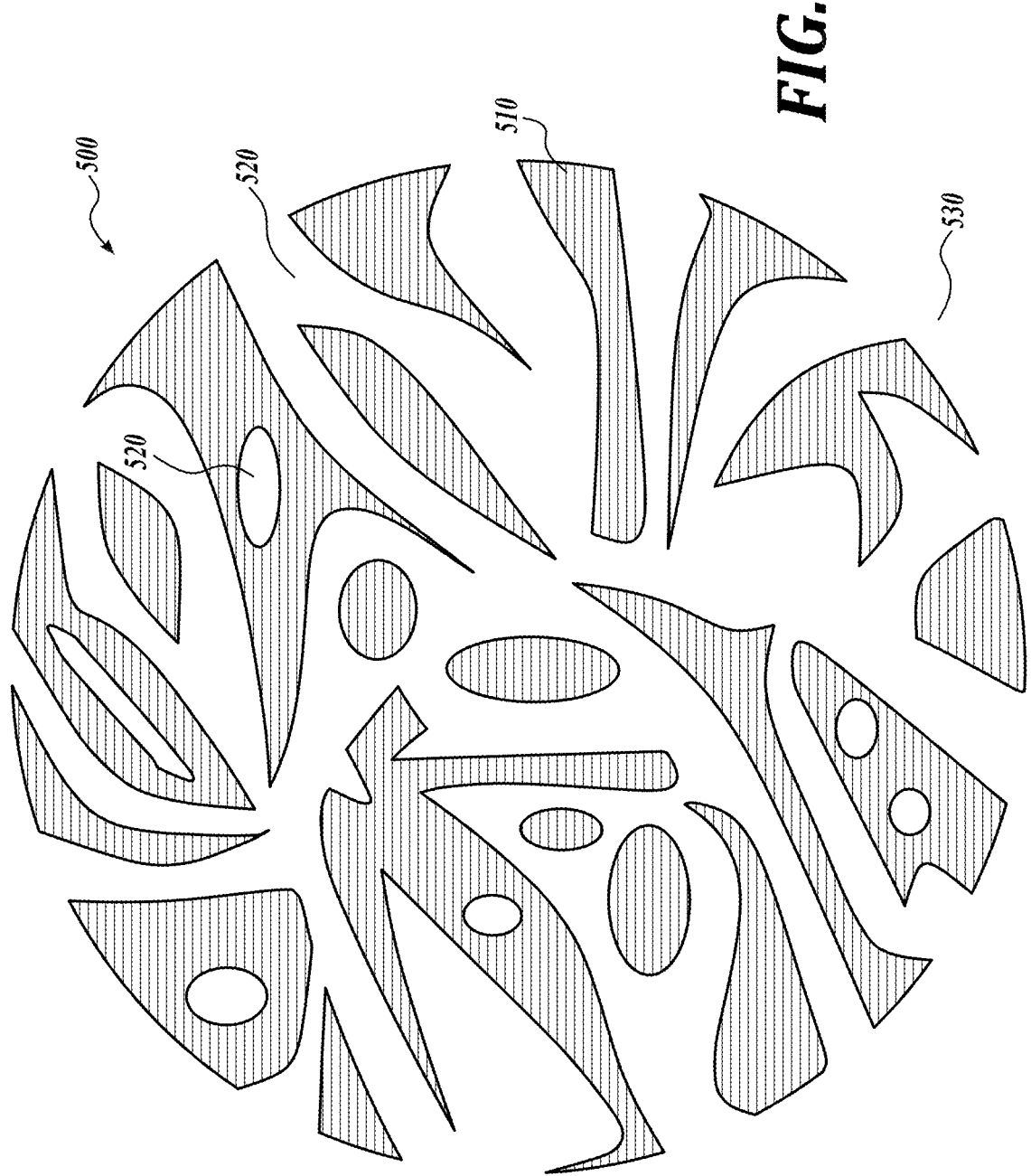
FIG. 5 is graphical representation of an embodiment of a binary catalyst of the present disclosure, showing a particle of a primary catalyst, and mesopores and catalytic surfaces within the particle.

As discussed above, in general, the HBCs include a primary catalyst that can be a highly porous particle and a secondary catalyst. The secondary catalyst is hybridized to the surfaces (e.g., the internal porous surface and/or the external surface) of the primary catalyst. In some embodiments, referring to FIG. 5, the primary catalyst 500 is a metal zeolite. The metal zeolite has a plurality of metal oxide secondary catalyst nanoparticles, which is a mixed crystal structure containing elements (e.g., Si and/or Al, or Si and Al) from the primary catalyst on the metal zeolite's inner and/or outer surface. The metal zeolite can have a large surface area provided by a variety of pores, such as micropores 510, mesopores 520, and macropores 530. The micropores have a maximum pore dimension of up to 2 nm. The mesopores have a maximum pore dimension of from 2 to 50 nm. The macropores have a maximum pore dimension of greater than 50 nm. In some embodiments, the macropores are the spaces between particles of primary catalyst 500.

Without wishing to be bound by theory, it is believed that the pores provide access for penetration of a secondary catalyst precursor into the primary catalyst, such that the secondary catalyst can form by incorporating structural elements at the surface of the primary catalyst and thereby crystallize in well-dispersed discrete locations within the primary catalyst. The higher surface area afforded by pores allows for decreased diffusion resistance and lower pressure difference for an exhaust gas that is to be treated by the HBC; resulting in greater fuel economy. A further advantage of secondary catalyst-containing primary catalyst is the sustained activity that can be afforded by the HBC under conditions where soot/ash covers the outer surfaces of a catalyst particle, which would otherwise poison the catalyst; however, with the HBCs, the likelihood of poisoning is decreased because the soot/ash cannot access the inner surface of the primary catalyst, which is covered by a dispersion of a secondary catalyst. Thus, the combination of a well-dispersed secondary catalyst on a primary catalyst can be resistant to formation of soot and ash. The well-dispersed secondary catalyst also provides highly reactive catalytic sites that can operate in a synergistic manner with the primary catalyst. For example, the secondary catalyst (e.g., a metal oxide) can adsorb NO and rapidly convert the NO to $NO_2$, which reacts in the presence of $NH_3$ on an adjoining primary catalyst site (e.g., a metal zeolite) to produce $N_2$. Because the secondary catalyst is well dispersed, a large surface area of catalytically active sites can be provided, with enhanced catalytic activity.

Without wishing to be bound by theory, it is believed that the HBCs provide different types of active sites that are located in close proximity to one another within and/or on an HBC particle. For example, the mesopores can include primary catalyst active sites in close proximity to hybridized secondary catalyst active sites. At the hybridized secondary catalyst active sites, the secondary catalyst is hybridized to the surface of the primary catalyst.

The different types of active sites can provide combined catalytic functionalities, faster reaction kinetics, synergy for high performance catalyst activity, and/or improved catalyst durability. Without wishing to be bound by theory, it is believed that faster reaction kinetics result from the increased number and close proximity of the catalyst active sites in HBCs, such that multiple catalytic reactions can occur in close proximity to one another both in time and space. For example, a SCR catalyst and a selective catalytic oxidation (SCO) catalyst can be spaced apart in the angstrom range in an HBC, which is closer in distance by 2 to 3 orders of magnitude compared to physically mixed particles of a SCR and SCO catalyst, as described, for example, in U.S. patent application Ser. No. 14/935,199.

Without wishing to be bound by theory, it is believed that the primary and secondary catalysts can act in synergy with respect to one another when catalyzing the decomposition of exhaust gases, where the primary and secondary catalysts can both participate in a redox reaction, with one catalyst acting as a reducing agent (e.g., an anode) and the other catalyst acting as an oxidizing agent (e.g., a cathode). The redox reaction is a spontaneous and self-perpetuating process that occurs at adjacent active sites, where mass transfer limitations are minimal due to the close proximity of the active sites. The HBC components can be selected to possess ion exchange/binding properties to enable ion transport between sites both on the surface and in the bulk material. For example, doping of $ZrO_2$ with $Y^{3+}$ cationic dopant creates lattice vacancies that permit $O^{2-}$ transport through the bulk.

In some embodiments, the HBCs have a primary catalyst that includes one or more metal zeolites. In some embodiments, the metal zeolite is aluminosilicate zeolites and/or silico-alumino-phosphate zeolites. For example, the metal zeolite can be an aluminosilicate zeolite. In certain embodiments, the metal zeolite is a silico-alumino-phosphate zeolite. In some embodiments, the one or more metal zeolites further include a cation such as $Cu^{2+}$ and/or $Fe^{3+}$ in the zeolite active sites. In certain embodiments, the metal zeolite also includes an alkali metal ion such as $Na^+$ and $K^+$ in the zeolite active sites to effectively neutralize (or cap) residual acid sites in the zeolite after doping with the desired catalytic metal ion. In certain embodiments, the one or more zeolite does not include any cations.

In some embodiments, the HBCs can include from 0.5 wt % (e.g., from 1 wt %, from 10 wt %, from 20 wt %, from 30 wt %, from 40 wt %, from 50 wt %, from 60 wt %, from 70 wt %, from 80 wt %, or from 90 wt %) to 99.5 wt % (e.g., to 90 wt %, to 80 wt %, to 70 wt %, to 60 wt %, to 50 wt %, to 40 wt %, to 30 wt %, to 20 wt %, to 10 wt %, or to 1 wt %) of the one or more metal zeolites. In certain embodiments, the HBCs can include from 10 wt % to 50 wt % (e.g., from 20 wt % to 40 wt %, from 30 wt % to 50 wt %, or about 30 wt %) of the one or more metal zeolites.

In some embodiments, the metal zeolite is a Fe-doped aluminosilicate zeolite, a Cu-doped aluminosilicate zeolite, a Fe- and Cu-doped aluminosilicate zeolite, a Fe-doped silico-alumino-phosphate zeolite, a Cu-doped silico-alumino-phosphate zeolite, and/or a Fe and Cu-doped silico-alumino-phosphate zeolite. In certain embodiments, the metal zeolite is a Fe-doped chabazite, a Cu-doped aluminosilicate chabazite, and/or a Fe and Cu-doped chabazite. In certain embodiments, the metal zeolite is a Fe and/or Cu-doped silico-alumino-phosphate zeolite, and Fe- and/or Cu-doped aluminosilicate zeolite in combination. In certain embodiments, the metal zeolite is a chabazite. In certain embodiments, the metal zeolite is SSZ-13, or a zeolite having SSZ-13 type structures and/or other thermally durable zeolites having good thermal resistance. In some embodiment, the zeolite of the binary catalyst includes silicon and aluminum, and is a small pore zeolite having maximum pore diameter of less than or equal to 5 angstroms. The small pore zeolite can include, for example, SSZ-13, SSZ-112, SSZ-52, SSZ-62, and SSZ-98.

In some embodiments, the HBCs have a secondary catalyst that includes one or more metal oxides. The metal oxides can be in the form of nanoparticles, having a maximum dimension of from 0.1 nm (e.g., from 1 nm, from 5 nm, from 10 nm, from 20 nm, from 30 nm, or from 40 nm) to 50 nm (e.g., to 40 nm, to 30 nm, to 20 nm, to 10 nm, to 5 nm, or to 1 nm). In certain embodiments, the metal oxides in the form of nanoparticles have a maximum dimension of from 1 nm to 5 nm (e.g., from 1 nm to 4 nm, from 2 nm to 5 nm, from 3 nm to 5 nm; about 3 nm). The secondary catalyst can be imaged via electron microscopy, and can be discrete nanoparticles located on the primary catalyst or within mesopores of the primary catalyst.

The one or more metal oxides of the secondary catalyst of the HBCs can include, for example, cerium oxide, titanium oxide, zirconium oxide, aluminum oxide, silicon oxide, hafnium oxide, vanadium oxide, niobium oxide, tantalum oxide, chromium oxide, molybdenum oxide, tungsten oxide, iridium oxide, nickel oxide, barium oxide, yttrium oxide, scandium oxide, calcium oxide, barium oxide, manganese oxide, lanthanum oxide, strontium oxide, cobalt oxide, copper oxide, iron oxide, and/or any combination thereof. In some embodiments, the one or more metal oxides of the HBCs are zirconium oxide, vanadium oxide, cerium oxide, manganese oxide, chromium oxide, cobalt oxide, titanium oxide, tungsten oxide, barium oxide, and/or any combination thereof. In certain embodiments, the one or more metal oxides of the HBC include zirconia, ceria, vanadia, chromium oxide, barium oxide and niobium oxide.

In some embodiments, the one or more metal oxides of the secondary catalysts of the HBCs further include a cationic dopant. For example, the cationic dopant can include a cation and/or an oxide of Y, Mn, V, Ce, Co, Fe, and any combination thereof. In some embodiments, the cationic dopant can include an oxide that includes $Y^{3+}$ $V^{4+}$, $Mn^{2+}$, $Fe^{3+}$, $Co^{2+}$, $Ce^{4+}$, and any combination thereof. In some embodiments, the improvements to $NH_3$ storage and $N_2O$ make of the cationic dopants can be ranked in the order of Y>Mn>V>Ce>Co>Fe. In some embodiments, the cationic dopant can be in the form of an oxide, and/or in the form of dopants in the HBC compositions. In some embodiments, when in the form of dopants, the dopant cations are achieved by incipient wetness impregnation and is bound by the anion exchange characteristics of the metal oxide.

The HBCs can provide flexibility in their compositions. In some embodiments, the one or more metal oxides of the secondary catalyst of the HBCs are $CeO_2$:$ZrO_2$ (i.e., a mixture of $CeO_2$ and $ZrO_2$ having, for example, from 40 wt % to 60 wt % $CeO_2$, $Y_2O_3$:$CeO_2$ (i.e., a mixture of $Y_2O_3$ and $CeO_2$, where, in some embodiments, has about 10 wt % of $Y_2O_3$), and/or Zr oxides. In some embodiments, the metal oxide of the secondary catalyst in the HBCs is $ZrO_2$, $Y_2O_3$:$ZrO_2$, $ZrV_2O_7$, and/or $CeO_2$:$ZrO_2$. In certain embodiments, while $CeO_2$ has higher oxidative power, $ZrO_2$ is selected instead as the secondary catalyst based upon both durability consideration and its ability to be modified by doping with strong oxidizing species (such as $Mn_3O_4$, $CoO_3$, $V_2O_7$, $Fe_3O_4$) and/or any combination thereof, and the like).

In some embodiments, the HBC do not include a cationic dopant. In some embodiments, the HBC consists of a metal oxide including a cationic dopant. In certain embodiments, the HBC consists of a metal oxide. In some embodiments, the one or more metal oxides do not include a cationic dopant. In some embodiments, the secondary catalyst consists of a metal oxide including a cationic dopant. In certain embodiments, the secondary catalyst consists of a metal oxide.

In some embodiments, the HBCs can have from 0.5 wt % (e.g., from 1 wt %, from 10 wt %, from 20 wt %, from 30 wt %, from 40 wt %, from 50 wt %, from 60 wt %, from 70 wt %, from 80 wt %, or from 90 wt %) to 99.5 wt % (e.g., to 90 wt %, to 80 wt %, to 70 wt %, to 60 wt %, to 50 wt %, to 40 wt %, to 30 wt %, to 20 wt %, to 10 wt %, or to 1 wt %) of the one or more metal oxide secondary catalysts.

The HBCs can have a variety of desirable properties. For example, the HBCs can have a thermal resistance of up to 600° C.

The HBCs can have tailored cold start and cold FTP cycle performance. The HBCs can provide $NO_x$ reduction catalyst compositions with effective performance in low or zero $NO_2$ conditions.

In some embodiments, the HBCs have a BET surface area of at least 200 m²/g (e.g., at least 300 m²/g, at least 400 m²/g, or at least 500 m²/g). Without wishing to be bound by theory, it is believed that HBC with a large BET surface area has greater catalytic activity compared to an HBC with a smaller BET surface area.

In some embodiments, the HBC has increased catalytic activity compared to a catalyst including a physical mixture of metal oxide nanoparticles and a non-porous metal zeolite.

In some embodiments, an HBC-based SCR catalyst is composed of zeolites with relatively high thermal resistance (e.g., small micropores) zeolites such as SSZ-13), which has been doped with $Cu^{2+}$ and/or $Fe^{3+}$. The secondary catalyst in the HBC-based SCR catalyst can be a metal oxide that has an oxidative power that can be tailored based upon the trade-off between $NO_x$ reduction performance and durability, such as $ZrO_2$ or Y-doped $ZrO_2$, $ZrV_2O_7$, and/or $CeO_2$:$ZrO_2$. The HBC-based SCR catalyst can be employed in a conventional SCR and/or in a SCRF configuration.

In certain embodiments, the HBC-based SCR catalyst includes a metal oxide secondary catalyst such as $CeO_2$:$ZrO_2$ (i.e., a mixture of $CeO_2$ and $ZrO_2$, such as from 40% to 60 wt % Ce in Zr), $Ce_{0.6}Zr_{0.4}O_x$ where x is an amount of O that counterbalances the Zr and Ce cations of the composition, $Y_2O_3$:$CeO_2$ (i.e., a mixture of $Y_2O_3$ and $CeO_2$), $Y_2O_3$:$ZrO_2$, $ZrV_2O_7$.

An HBC-based urea hydrolysis-SCR catalyst can have the same composition as an HBC-based SCR catalyst, and/or have a dramatically reversed ratio of zeolite-to-metal oxide (i.e., with the metal oxide secondary catalyst as the majority species in the HBC). In some embodiments, the HBC includes metal oxide nanoparticles and a metal zeolite. The metal zeolite has metal oxide nanoparticles hybridized on the available surfaces. In certain embodiments, the HBC-based urea hydrolysis catalyst is applied to the surface of a catalytic substrate and has a $NO_x$ conversion efficiency of at least 10%.

Hydrolysis Catalyst Washcoat Procedure:

A washcoat slurry including the following can be used to coat a catalytic substrate (e.g., a metallic catalytic substrate), which can first be surface roughened by abrasion, degreased with isopropanol and washed with deionized water: HBC (Type B, see below), deionized water; optionally lactic acid; poly(ethylene glycol-ran-propylene glycol) (e.g., having a molecular weight $M_n$ of about 2,500); poly(ethylene oxide) (e.g., having a molecular weight $M_v$ of about 300,000). Following mixing or milling (such as milling using a roller mill apparatus), the washcoat slurry can be cooled to room temperature and applied to a substrate, such as a metallic mixer and/or a catalytic substrate. After drying for a period of 8-12 hours in air, the coated substrate can be dried in an air oven at about 100-120° C. A second coating can be optionally applied, and the coated substrate can be calcined (e.g., for 1 hr at about 450-650° C.). Relative durability of the coating can be determined by weighing before and after applying a blast of $N_2$ at 70 psig.

In some embodiments, a washcoat slurry including the following can be used to coat a catalytic substrate (e.g., a metallic catalytic substrate), which has been surface roughened by abrasion, degreased with isopropanol and washed with deionized water: 3.5 g HBC (Type-B) based upon CuZSM-5 zeolite with 35% hybridized $ZrO_2$; 12 g deionized water; 0.3 g lactic acid; 0.3 g poly(ethylene glycol-ran-propylene glycol) Mn ~2,500; 0.3 g poly(ethylene oxide) Mv 300,000 (all reagents obtained from Sigma-Aldrich). Following extensive mixing in a roller mill apparatus, the slurry was cooled to room temperature and applied to the substrate. After drying for a period of 8-12 hours in air, the coated substrate was dried at 105° C. in an air oven. A second coating was then applied. The washcoat was calcined for 1 hr at 450° C. Relative durability of the coating was determined by weighing before and after applying a blast of N2 at 70 psig.

In some embodiments, the HBC can bind and oxidize SCR catalyst poisons, such as hydrocarbons, sulfur, phosphorus, or a combination thereof.

Hybrid Binary Catalyst Preparation

An HBC can be synthesized using two different methods, Type-A and Type-B, as outlined below.

Type-A—hybridization between zeolite and metal oxide, followed by copper exchange of the hybrid zeolite/metal oxide material to allow copper to be loaded on both the zeolite and the metal oxide components of the hybridized material.

Type-B—copper exchange of the zeolite (only) provides Cu-zeolite crystals, followed by hybridization to covalently link precursor molecules that transform into metal oxide nanoparticles on the surfaces of Cu-zeolite crystals.

Two hybridization procedures can be employed under the Type-A HBC synthesis method, using metal oxide precursors:

Procedure A—metal oxide precursors were dissolved in acidic aqueous solution, and the resulting mixture was vigorously stirred to obtain slurry containing zeolite particles. The metal oxide precursors were then reacted with the zeolite by neutralizing at elevated temperature (typically with 65° C.), with dropwise addition of ammonium hydroxide solution.

Procedure B—two separate aqueous solutions of reactive precursor were prepared. The first solution contained the zirconium precursor (and potentially other precursors in acid solution), along with the zeolite powder. Upon adding the second solution to the slurry, the hybridization reaction occurred instantaneously.

Procedure A: Co-Precipitation of Precursors from Acid Solution

In general, procedure A includes mixing metal oxide precursor reagents in the appropriate stoichiometric proportions in deionized ("DI") water with urea (a chelating agent) to facilitate nucleation of the precipitating metal oxide(s) at active centers (e.g., Al, Si and P species) on the zeolite crystal surfaces. Examples of precursor reagents include zirconyl chloride octahydrate, ammonium cerium nitrate, potassium permanganate, cobalt nitrate hexahydrate, barium nitrate, ortho phosphoric acid, ammonium molybdate tetrahydrate, calcium nitrate tetrahydrate, chromium nitrate, nickel nitrate, potassium permanganate, titanium chloride, tungsten chloride. The selected zeolite can be added to the clear solution in the powder form, with vigorous stirring to obtain a thoroughly mixed slurry. Optionally, random copolymer poly(ethyleneglycol-ran-polypropyleneglycol) (i.e., PEO-PPO) can be added to obtain optimal uniformity of nanoparticles size and distribution. Heat can be applied (e.g., to about 65° C.) to the slurry and a $NH_4OH$ aqueous solution can be added. The endpoint of the site-directed hybridization reaction can be established when the sol-gel point has been surpassed, which is marked by a dramatic increase in viscosity. Vigorous stirring and continuous heating can allow the high viscosity to decrease, and additional $NH_4OH$ can be added to ensure that all of the available precursors or reactive moieties have been covalently bonded to the zeolite surfaces. Where cobalt precursor is employed, the endpoint is accompanied by a very distinctive color change from bright pink to "cobalt blue". The lack of color in the filtrate and bright cobalt blue color of the retrieved product can be used as a clear indication that most (or all) of the $Co^{2+}$ precursor has been preferentially hybridized to the zeolite surface.

The entire mixture can be either briefly quenched in an ice-bath or filtered while hot. Washing should be conducted with generous quantities of deionized water. The solids should be washed, air dried, oven dried at between 105° C.-120° C. (e.g., for 1 hr), and then calcined at 600° C. (e.g., for 1 hr).

Procedure B: Incipient Co-Reactive Precursor Precipitation

In general, for procedure B, two separate aqueous solutions of reactive precursor are prepared. A first solution contains zirconium and other precursors that only react when neutralized with $NH_4OH$, along with the zeolite powder to form a slurry. The second solution contained a metal oxide precursor, such as ortho phosphoric acid, sodium vanadate, titanium chloride, and/or ammonium molybdate. When the second solution is added to the first solution, the metal oxide precursors in the second solution reacted instantly with the zirconium precursor(s) in the first solution; at room temperature or cooled to below room temperature (e.g., to −15° C.) to regulate the kinetics of the hybridization reaction to form metal oxide nanoparticles on the zeolite surface. The final $NH_4OH$ neutralization step ensures complete hybridization of the precursors to the zeolite surface.

Copper sulfate solution in DI water can be used to treat protonated zeolite, with or without concentrated sulfuric acid adjustment to pH 3. The mixture can be heated at 80° C. for 1-3 hrs, with constant stirring. The copper-exchanged product should be filtered, washed with generous amounts of DI water, air dried, oven dried at between 105° C.-120° C. (e.g., for 1 hr), then calcined at 550° C. (e.g., for 1 hr).

In some embodiments, to make Type-B HBC, copper sulfate solution is first incubated with zeolite at 80° C. for 3 hours with vigorous stirring, and processed as described previously for Type-A hybrid binary catalysts to provide Cu-Zeolite powder, then the Cu-Zeolite powder and metal oxide precursors can be reacted as described in the copper exchange procedure for Type-A hybrid binary catalysts to achieve hybridization. The obtained product can be further treated as described above for Type-A hybrid binary catalysts.

In some embodiments, the HBCs are made by providing an aqueous solution including a chelating agent (e.g., urea) and a metal oxide precursor such as $ZrOCl_2 \cdot 8H_2O$, $NaVO_3$, $(NH_4)_6Ce^{IV}NO_3)_4$, $KMnO_4$, $Co(NO_3)_2$ (e.g., cobalt nitrate hexahydrate); mixing the aqueous solution including the chelating agent and the metal oxide precursor with a zeolite catalyst to provide a metal oxide precursor-coated zeolite; and calcining the metal oxide precursor-coated metal zeolite to provide the HBC. The HBC include metal oxide nanoparticles bound to the metal zeolite.

While synthetic and naturally occurring zeolites can be employed in the synthesis of a metal oxide-coated zeolite, mesoporous zeolites are especially advantageous as they can provide sustained reactivity and enhanced catalytic properties, as previously discussed.

The HBCs can be used and synthesized as catalyst washcoat compositions. In washcoat compositions, the HBCs can have a primary zeolite catalyst having a maximum particle dimension of less than 1,000 nm. When the primary zeolite catalyst is a mesoporous particle, very high internal surfaces areas (e.g., up to about 700 $m^2/g$) are accessible to reactant species for synthesizing the metal oxide secondary catalyst directly on the internal and/or external surfaces to form an HBC in situ. By utilizing aqueous chemistry, the fully expanded and open pore structure of the highly hydrophilic zeolite can be accessed by the secondary catalyst precursors throughout the hybridization reaction.

Analysis of the HBCs can be carried out using a variety of techniques, such as inductively coupled plasma (ICP) spectroscopy, which provides accurate elemental compositions; X-Ray diffraction, which provides information on the structural properties (e.g., crystallinity) that relates to both composition and durability; BET surface area analysis, which provides both available surface area for catalyst reaction and porosity information, which in turn correlates to access of reactants to the activity sites; synthetic gas bench (SGB) performance testing provides emissions control testing information when the catalyst is applied to a monolith substrate in the form of a washcoat, and where conditions simulating on-engine test conditions are employed in this test so that realistic conclusions related to diesel emissions control can be drawn from the results; electron energy loss spectroscopy (EELS), which complements ICP by conducting elemental analysis in situ, without having to digest the sample in concentrated acid; scanning electron microscopy (SEM) and scanning transmission electron microscopy (STEM) provide in situ microstructural and elemental analysis, depicting the catalyst in its actual functional state; and/or thermogravimetric analysis (TGA) and Fourier transform infrared (FTIR) spectroscopy, which in combination permit analysis of urea thermolysis kinetics.

EXAMPLES

Example 1: Fabrication of UH-SCR

A 1-liter custom-made electrically heated catalyst (EHC (purchased from Continental)) was made that included a metallic substrate equipped with an attached electric heater having a matrix diameter of 98.4 mm, a matrix substrate length of 150 mm, a mantle length of 180 mm, a mantle material 1.4509, a cell density of 300 cpsi; a foil thickness 0.065 mm, and having a foil type 1.4725. A 50 g/L (i-CBC) washcoat was applied on the EHC, covering both the electrically heated portion and catalyst substrate portions for on-engine testing. The applied electrical power was either 2.7 or 5.6 kW, depending on the experimental design.

Example 2: On-Engine Testing of UH-SCR Compared to Uncoated Heated Metallic Substrate The standard test specifies the FTP (both cold and hot) method for the determination of gaseous and particulate emission values of a heavy-duty engine with a transient cycle in accordance with the applicable subparts of part 86 and part 1065 of title 40 "Protection of Environment" of the Code of Federal Regulations.

The low load cycle (LLC-7), taken from the Mobile Source Division, California Air Resource Board (Jan. 23, 2019) involved two FTC pre-treatment cycle as follows:
 1. Regenerate 35 minutes;
 2. Motor at 1500 rpm/0% pedal for 5 minutes;
 3. 20 min soak with engine off;
 4. 1 FTP;
 5. 20 minute soak with engine off; and
 6. 1 FTP.

This pretreatment preceded the LLC-7 test cycle to emulate extended low load operation in stop-and-go traffic, with repeated idle and bursts of acceleration.

Figure 6:
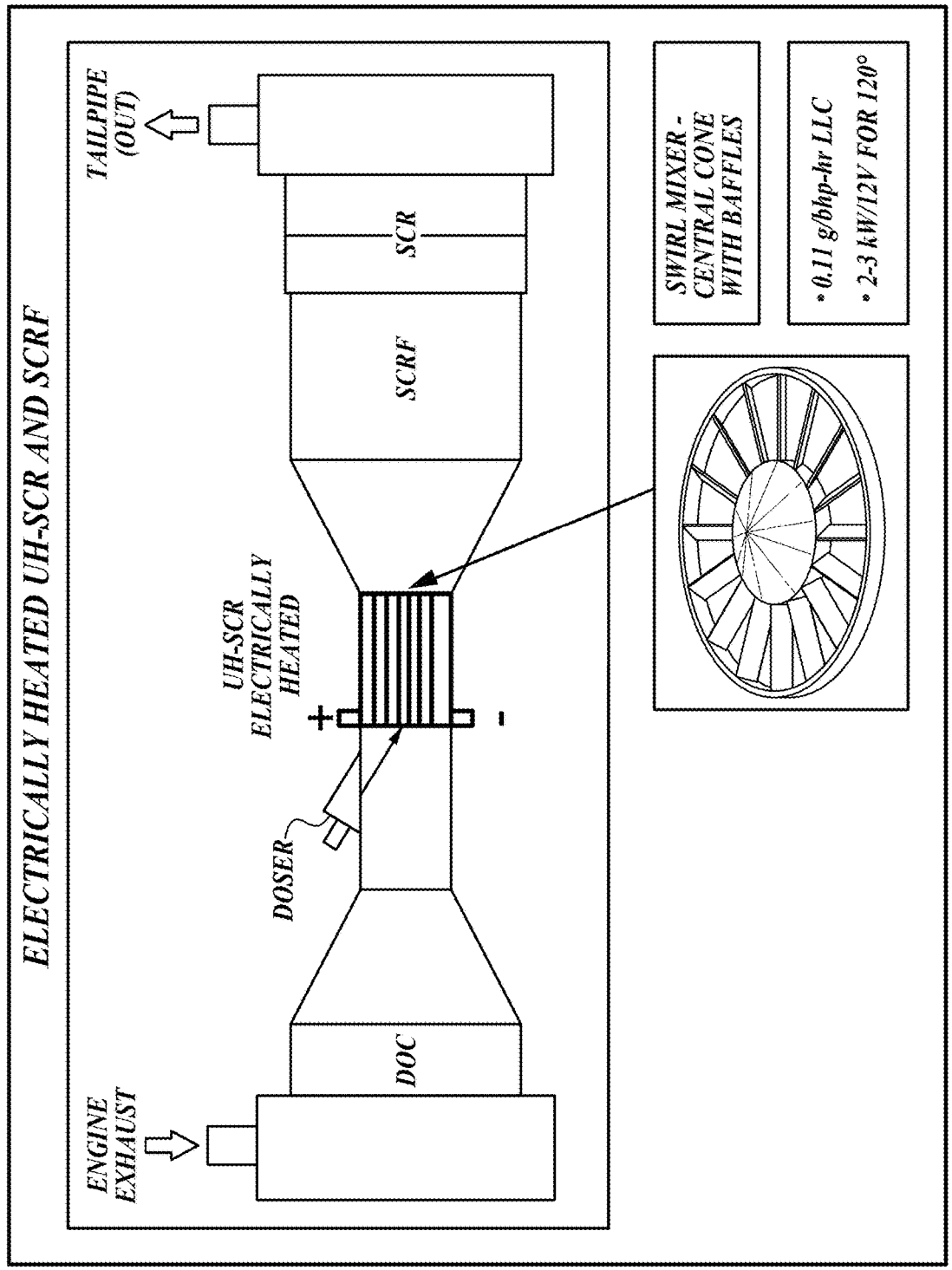
FIG. 6 is an illustration of an embodiment of an aftertreatment system of the present disclosure.

The electrically heated UH-SCR with a set of baffles downstream replaced the (swirl) compact mixer for urea decomposition in a PACCAR MY19 engine aftertreatment, with a cone-shaped connection to the 13" diameter SCRF and other full size devices (FIG. 6). DEF dosing occurred directly on the UH-SCR, with the (i-CBC) coated heater section closest to the doser, and the first delivery of DEF spray was 27 sec into the cold start phase. FIG. 6 shows an electrically Heated UH-SCR in Combination with SCRF-based Aftertreatment System.

TABLE 1

Comparing Coated vs Uncoated UH-SCR on UH-SCR/SCRF EAS

| UHSCR | Max Temp set for Heater (° C.) | Heater Power (W) | TPNOx (g/bhp-hr) | EONOx (g/bhp-hr) | BSDEF (g/kWh) | BSFC (g/kwh) |
|---|---|---|---|---|---|---|
| I-CBC UHSCR03 | 350 | 2688 | 0.054 | 4.109 | 13.45 | 262.20 |
| Uncoated UHSCR04 | 350 | 2688 | 0.099 | 4.164 | 13.94 | 261.67 |

Figure 7B:
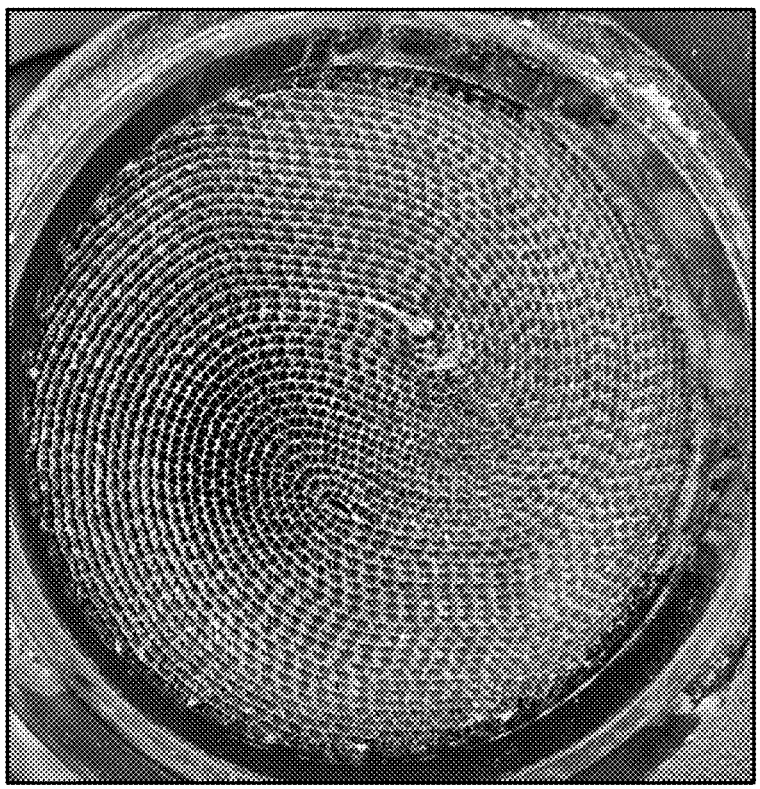
FIG. 7B is a photograph of a UH-SCR catalyst-coated catalytic substrate, showing no urea deposits in the channels.
Figure 7A:
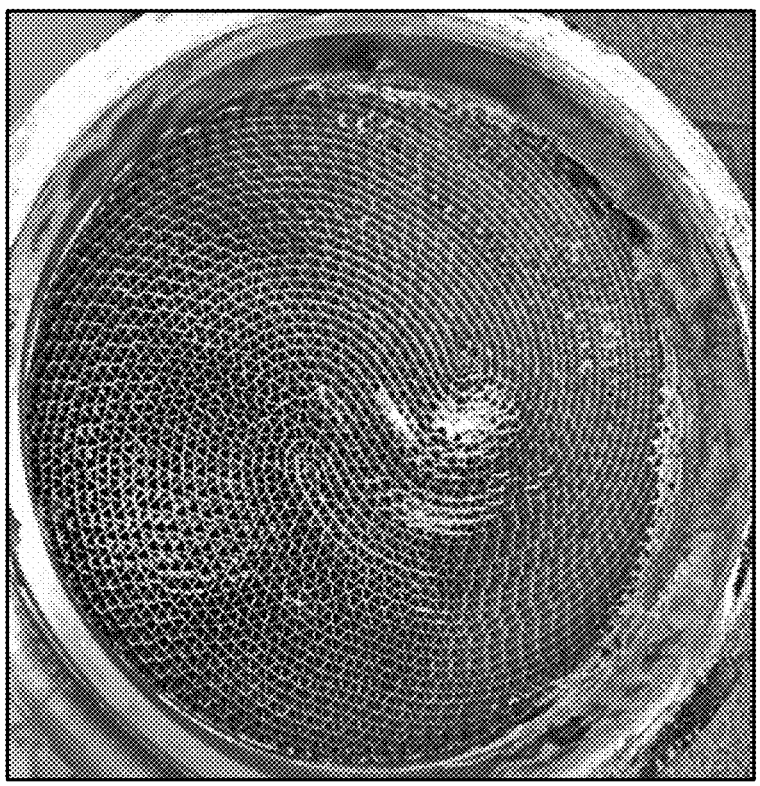
FIG. 7A is a photograph of a bare catalytic substrate without coated catalyst, and showing urea deposits in the channels.

TPNOx—Tailpipe Nox
EONOx—Engine Out Nox
BSDEF—Brake Specific DEF Consumption
BSFC—Brake Specific Fuel Consumption FIGS. 7A and 7B show photographs of a UH-SCR with no catalyst coating (FIG. 7A) and a UH-SCR coated with i-CBC (FIG. 7B). As can be seen in FIGS. 7A and 7B, urea deposited in the channels of the uncoated UH-SCR, completely obstructing certain channels of the uncoated UH-SCR. In contrast, upon simple visual inspection of the downstream end-on cross-section of the UH-SCR catalytic core, the catalyst-coated UH-SCR had clear channels with no urea deposit (the white film coating the channels of the UH-SCR corresponds to the catalyst coating).

The (i-CBC) coated EHC (UH-SCR) LLC test results show a 45% NOx reduction improvement compared to that for the uncoated EHC. Furthermore, as discussed above, unlike the uncoated EHC, the UH-SCR show no sign of urea deposit formation.

These results strongly indicate that the UH-SCR is contributing to overall aftertreatment performance in the following ways:

1. $NH_3$ production by the one-step ammonia production process from urea in equation (1) is a major contributing factor to urea decomposition, by virtue of the ability of the (i-CBC) catalyst to release ammonia gas from urea solution below the typical (>190° C.) of the SCR temperature for traditional start of dosing (FIG. 3); and the hydrolytic properties of the (i-CBC) catalyst to minimize urea deposit formation in the event of isocyanic acid (HNCO) formation from thermolysis.

2. NOx reduction by the UH-SCR at low temperatures greatly benefits low load cycle and potentially the early stages in the cold start phase. The UH-SCR can reduce NOx emissions well before the SCRF and traditional twin SCRs can attain optimal lightoff temperature, where ammonia stored during the two FTP pretreatment steps can also play a significant role. This can occur in part at low temperatures by a form of "passive NOx adsorption" to the $NH_3$ store by the UH-SCR (i.e., by a type of acid/base interaction).

Without wishing to be bound by theory, it is believed that NO gas can only bind to the i-CBC catalyst when the catalyst has first bound ammonia onto its surfaces. Only then is there an affinity for binding NO gas, likely by an acid/base affinity binding. Binding capacity is believed to be highest at low temperatures and decreases with increased temperature. Therefore, ammonia stored on the catalyst will start to passively adsorb EO $NO_x$ as soon as it starts to appear in the exhaust and is more likely to reduce $NO_x$ as temperatures increase rather than release it. In this way the low temperature binding of EO NOx resembles passive NOx adsorption, but differs by virtue of its ability to reduce the captured $NO_x$ to $N_2$ and $H_2O$ instead of releasing the $NO_x$. This indicates that the UH-SCR is carrying out three distinct functions:

passive NOx adsorption at low temperatures;
urea Hydrolysis below the thermolysis to produce ammonia at relatively low temperatures; and
NOx reduction during the first 60 seconds of cold start and beyond.

Example 3: Impact of UH-SCR on Ultra-Low NOx Compliance

Standard composite FTP (i.e., cold and hot combined) and LLC-7 tests compared traditional MY2019 aftertreatment, three different types of SCRF-based systems, and one modified with both the UH-SCR and a SCRF including an i-CBC catalyst. The results are shown below. Traditional MY2019 (baseline) SCR catalyst completed the aftertreatment system in all configurations.

California Air Resources Board (CARB) has proposed low load cycle for 2024 for regulating heavy-duty diesel truck emissions in the urban environment, drayage, etc. Conventional wisdom indicates that the low load cycle will be extremely challenging due to the relatively low exhaust temperatures. These low temperatures are due to low load conditions and repeated idling, combined with periodic sudden acceleration.

Comparing the data for the two catalyst (catalysts 3.0, corresponding to a commercial aftertreatment system with SCRF, and 4.0) in Table 2, it is apparent that employing a SCRF before the twin SCRs does not necessarily improve tailpipe NOx emissions. However, when an i-CBC-based SCRF is placed upstream of the twin SCRs of a baseline system (catalyst 1.0 in Table 2), this results in a marked reduction in NOx emissions compared with the baseline alone, suggesting that the SCRF in 1.0 is far more effective than that used in catalyst ID 3.0. Furthermore, tailpipe emissions are further improved in Catalyst 1.1 in Table 2 below, where UH-SCR and the (i-CBC) based SCRF are combined. Similarly, for Catalyst 2.1, where despite differences in the SCRF catalyst, the (i-CBC) based UH-SCR in each case was determined to be the primary factor in reducing tailpipe NOx emissions to within the range specified by the proposed 2024 CARB standard.

TABLE 2

Comparison of Composite FTP Performance by Different Aftertreatment Configurations

| Catalyst ID | Aftertreatment Configuration | Composite FTP Emissions g/bhp-hr |
|---|---|---|
| 1.0 | i-CBC based SCRF (+2 SCR) | 0.061 |
| 2.0 | HBC based SCRF (+1 SCR) | 0.112 |
| 1.1 | (i-CBC)-based SCRF (UH-SCR/+2 SCR) | 0.043 |
| 2.1 | HBC-based SCRF (UH-SCR/+2 SCR) | 0.046 |
| 3.0 | Competitor SCRF (+2 SCR) | 0.159 |
| 4.0 | Baseline MY18EAS (+2 SCR) | 0.082 |
|  | Proposed 2024 CARD Standard | 0.05-0.08 |

Note:
UH-SCR powered by 2.7 kW

Example 4: Effect of DEF Dosing Quantity in Cold Start Tailpipe NOx

Standard dosing procedure starts when the SCR catalyst in an aftertreatment (DOC/DPF/SCR/AMOX) attains >190° C. However, the UH-SCR is able to decompose urea to produce $NH_3$, store ammonia and conduct NOx reductions at temperatures much below 190° C. Therefore, varying both the temperature and quantity of DEF delivered at the start of dosing facilitate reduction of EO NOx starting at 27 seconds into the (600 sec) cold start phase.

TABLE 3

Comparing Cumulative DEF Sprayed and Corresponding ANR with the Quantity of DEF Dosed at Different Time Points

| | 60 Sec Time Point | | 90 Sec Time Point | | 120 Sec Time Point | |
|---|---|---|---|---|---|---|
| Dosing % | Accumulated DEF Quantity (g) | ANR (mol/mol) | Accumulated DEF Quantity (g) | ANR (mol/mol) | Accumulated DEF Quantity (g) | ANR (mol/mol) |
| 100 | 14 | 1.79 | 16.9 | 2.09 | 16.9 | 0 |
| 70 | 9.6 | 1.2 | 11.5 | 1.24 | 11.5 | 0 |
| 60 | 9.4 | 1.05 | 11.7 | 1.3 | 11.7 | 0 |
| 50 | 8.1 | 0.88 | 10.1 | 1.1 | 10.1 | 0 |
| 40 | 5.4 | 0.69 | 6.7 | 0.8 | 6.7 | 0 |
| 30 | 5.5 | 0.5 | 6.7 | 0.57 | 6.7 | 0 |

Note:
ANR: ammonia to $NO_x$ ratio.

The ammonia to NOx ratio (ANR) of about 1.0 is generally in the target range for optimal NOx reduction, based upon the 1:1 relationship of the reaction stoichiometry. An ANR value greater than 1.0 indicate that the potential for inefficient urea decomposition and over-dosing exists, which over time leads to urea deposit accumulation. Table 3 illustrates the impact of varied quantity of DEF delivered on ANR at three time points (60, 90 and 120 sec), at the beginning of the cold start phase. The quantity of DEF sprayed under baseline conditions (defined as 100%), was varied, while retaining the spray (pulse) pattern. At 90 seconds into the cold start phase, the engine dropped to idle, resulting in a cessation of dosing. Therefore, during the 90 to 120 sec period there is no dosing, hence the ANR=0 in Table 3.

Figure 8A:
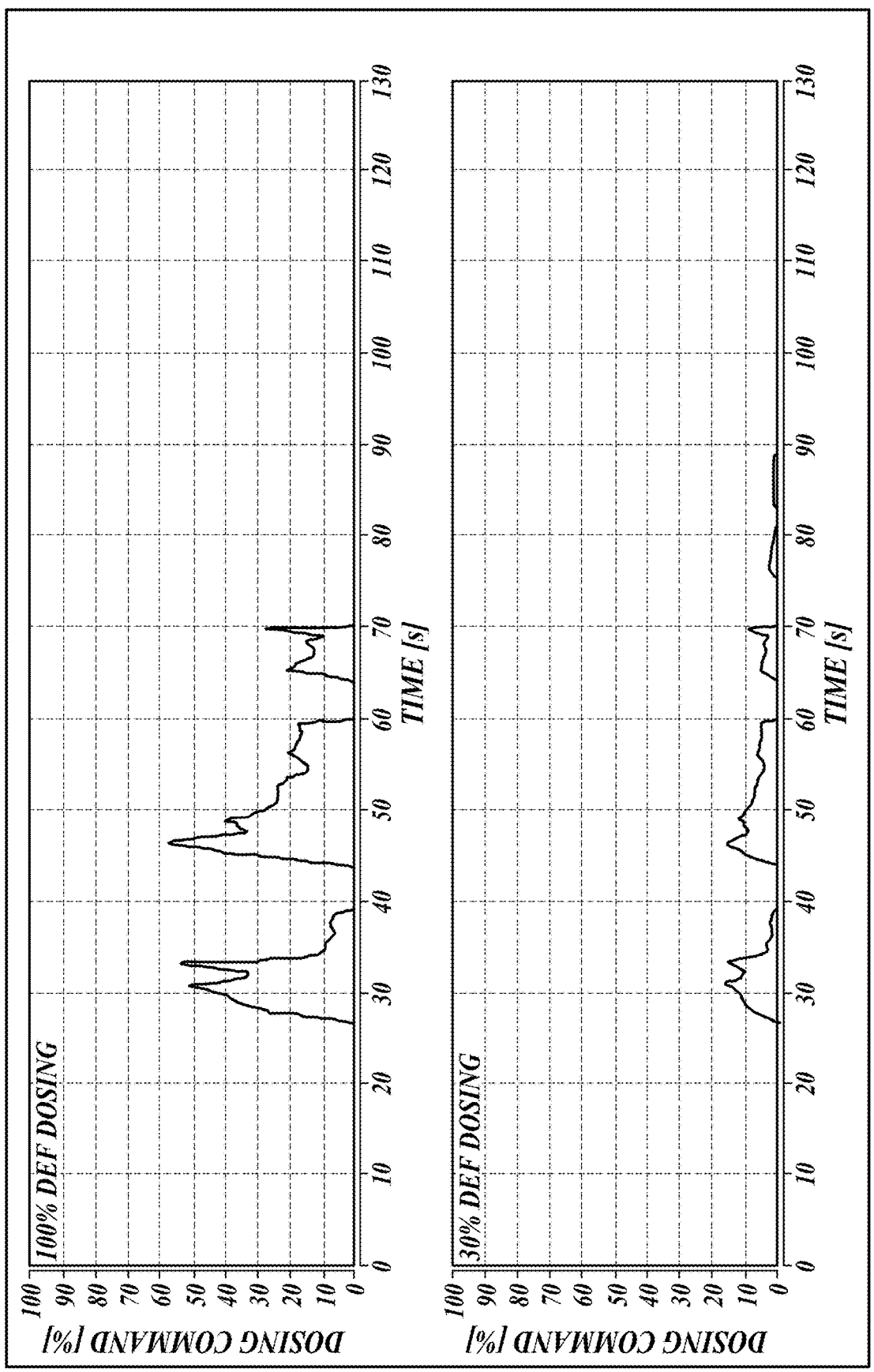
FIG. 8A a graphical depiction of DEF dosing as a function of time, where the percentage of DEF delivered is controlled by altering the dosing command.
Figure 8B:
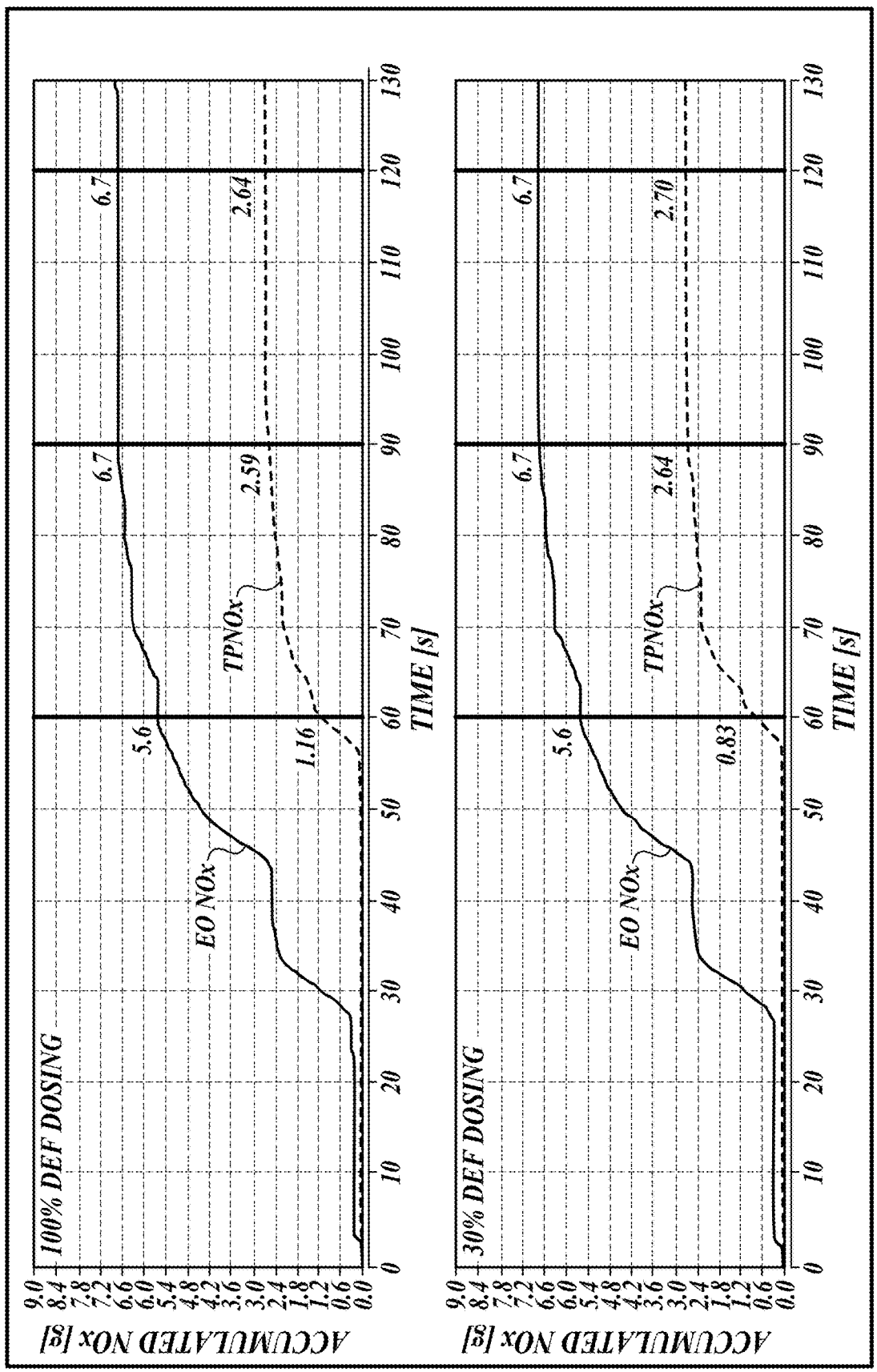
FIG. 8B is a graph showing the accumulated engine-out (EO) $NO_x$ and tailpipe $NO_x$ at three time points for an embodiment of an aftertreatment system including a UH-SCR catalytic core.
Figure 9:
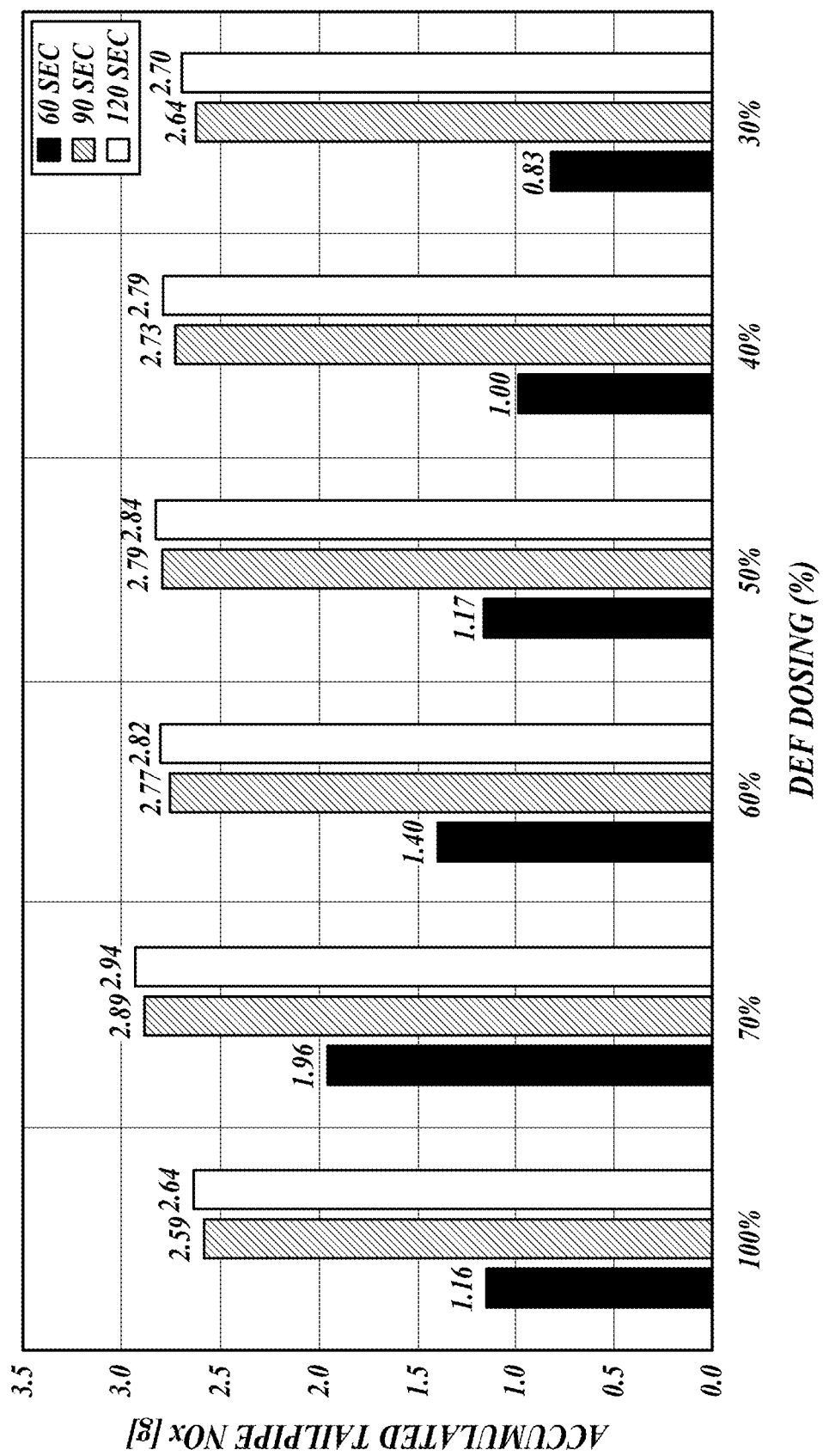
FIG. 9 is a bar graph showing the accumulated tailpipe $NO_x$ at three time points for an embodiment of an aftertreatment system of the present disclosure.
Figure 10:
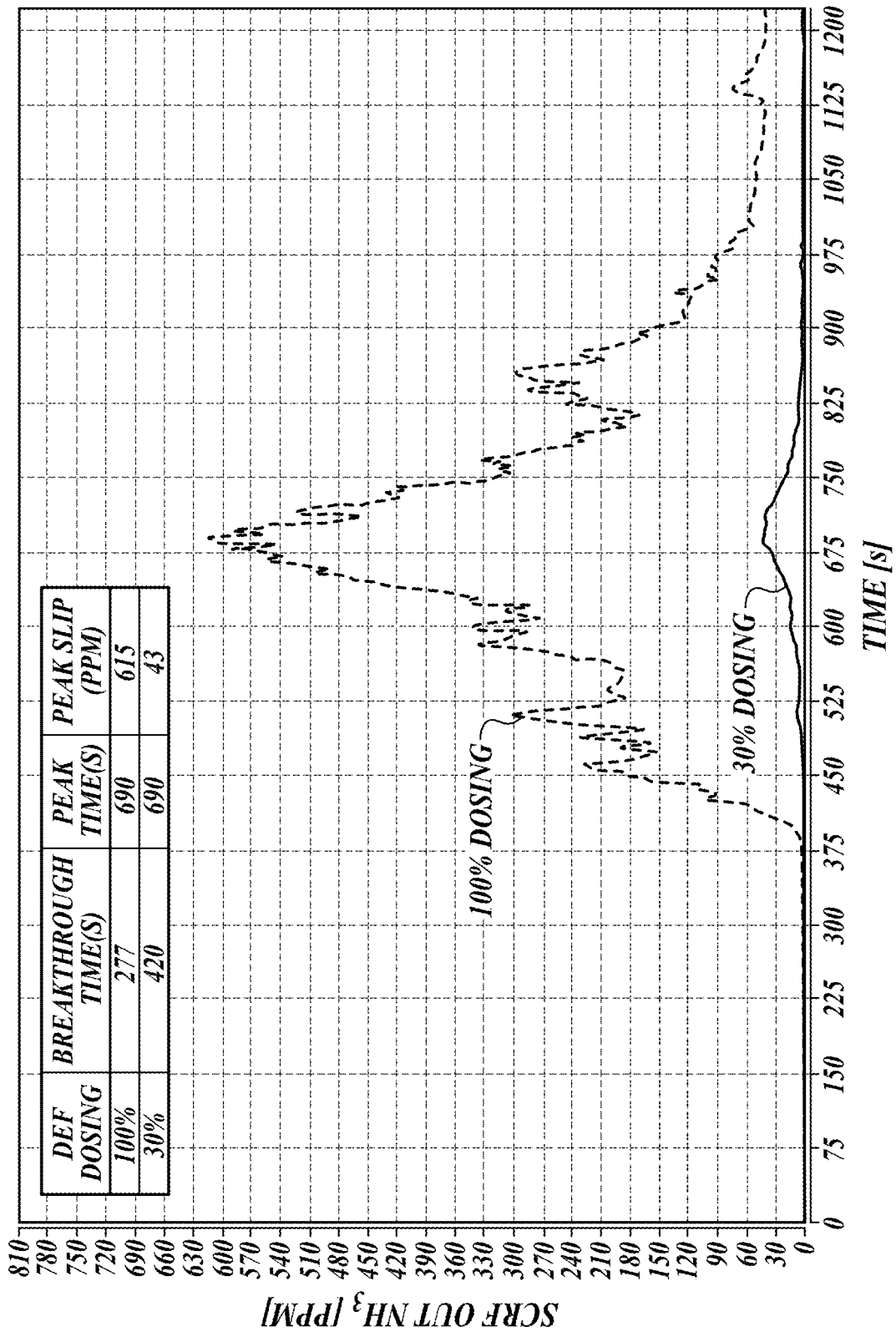
FIG. 10 is a graph showing the comparison between the ammonia slip from a SCRF during the baseline (100%) and 30% dosing strategies for an embodiment of an aftertreatment system of the present disclosure.

FIG. 8A is a graphical depiction of DEF dosing as a function of time, where the percentage of DEF delivered is controlled by altering the dosing command. FIGS. 8B, 9, and 10 show the accumulated engine-out (EO) $NO_x$ and tailpipe $NO_x$ at three time points (FIG. 8B), in early cold start phase as a function of the dosing sequence shown in FIG. 8A. The UH-SCR was powered by 5.6 kW. The main conclusions from the study are as follows:

The most dramatic effect occurs at the 60 second time point, indicating that the 1 Liter UH-SCR is functioning at the very earliest part of the cold start phase (FIG. 8B).

Tailpipe NOx at the 60 second time point was lowest with 30% dosing, corresponding to 85% NOx reduction by the UH-SCR.

Surprisingly, referring to FIG. 9, the baseline dosing (100%) resulted in lower tailpipe NOx than 70%, 60%, and 50% dosing; which is contrary to the general trend of decreasing tailpipe NOx from 70 to 30%. Without wishing to be bound by theory, it is believed that these results were potentially due to the experimental design, going from high to low dosing level, and the effect of over-dosing. Over-dosing (e.g., at 100%) effectively caused flooding of the catalyst with liquid DEF, blocking access to catalytic sites required by NOx in the exhaust gas and resulting in crystallization of urea at low temperatures in the EHC 300 cpsi channels. Despite of the use of a (610° C.) regeneration step between each experiment, complete removal of solidified urea from the 300 cpsi channels of EHC requires a substantial amount of time and heat treatment. This could explain why 70% dosing has higher tailpipe NOx than the baseline case, and why over-dosing should be avoided.

Baseline dosing resulted in the lowest tailpipe NOx for both the 90-second and 120-second time points, with the 30% dosing strategy not very much higher. Again, this suggests that:

The negative effects of over-dosing at 100% potentially persisted for the duration of the experiment.

Even lower levels of dosing than 30% (relative to baseline) could be optimal.

An optimized dosing strategy for cold start can involve a steady and systematic increase in the quantity of DEF dosing, based upon the demand dictated by transient EO NOx levels. Combined $NH_3$/NOx sensors located before and after each catalyst in the aftertreatment system can be included as system components.

The comparison between the ammonia slip from the SCRF during the baseline (100%) and 30% dosing strategies (FIG. 10), illustrates that DEF dosing ramp-up ca increase the effective use of the UH-SCR in achieving the ultimate goal of 0.02 g/bhp-hr.

Table 4 compares UH-SCRF and SCRF temperatures with engine-out $NO_x$ for the duration of cold start phase. Table 4 shows that a 10 Liter UH-SCR can have sufficient SCR capacity to reduce the EO NOx in the cold start phase until the SCRF optimal lightoff temperature is achieved, thereby providing a viable low cost and low technological alternative to ccSCR, PNA, various engine designed-based thermal management strategies and burners.

TABLE 4

Comparing UH-SCRF and SCRF Temperatures with EO NOx for the Duration of Cold Start Phase

| Cold Start Time Point (sec) | UH-SCR Temp-IN (° C.) | UH-SCR Temp-OUT (° C.) | SCRF Ave Bed Temperature (° C.) | EONOx (g) |
|---|---|---|---|---|
| 60 | 64 | 92 | 70 | 5.6 |
| 90 | 163 | 191 | 102 | 6.73 |
| 120 | 174 | 256 | 114 | 6.74 |
| 150 | 178 | 328 | 131 | 6.75 |
| 200 | 169 | 304 | 135 | 6.99 |
| 250 | 210 | 229 | 146 | 12.1 |
| 300 | 228 | 328 | 166 | 13.22 |
| 350 | 238 | 284 | 161 | 13.34 |
| 400 | 237 | 258 | 186 | 16.13 |
| 450 | 272 | 296 | 219 | 18.21 |
| 500 | 261 | 280 | 234 | 20.14 |
| 550 | 285 | 347 | 249 | 21.21 |
| 600 | 327 | 357 | 275 | 24.68 |

While illustrative embodiments have been illustrated and described, it will be appreciated that various changes can be made therein without departing from the spirit and scope of the invention.

The invention claimed is:

1. A catalyst aftertreatment system, comprising:
a dosing compartment comprising a doser configured to introduce a diesel exhaust fluid (DEF) comprising urea into a diesel exhaust;
a mixing chamber subsequent to the doser configured to mix the DEF with the diesel exhaust, the mixing chamber including a static metallic mixer, and a catalyst substrate having a binary catalyst coated thereon;
wherein the binary catalyst comprises a zeolite having a crystal lattice comprising a metal oxide, wherein the metal oxide is covalently bound to elements within the crystal lattice; or a plurality of metal oxide nanoparticles hybridized to a zeolite, wherein the metal oxide nanoparticle has a maximum dimension of from 0.1 to 50 nm; or any combination thereof; and
wherein the binary catalyst is configured to simultaneously hydrolyze urea to generate ammonia, store $NH_3$, and reduce $NO_x$ within 60 seconds of a cold start event, with no visible urea deposit formation on the catalyst substrate over a period of at least 40 test runs;
a SCR unit subsequent to the mixing chamber unit, comprising an SCR catalyst configured to facilitate reduction of nitrogen oxide (NOx) in the diesel exhaust with $NH_3$.

2. The catalyst aftertreatment system of claim 1, wherein the mixing chamber further comprises a heating element thermally coupled to the static metallic mixer and/or the catalyst substrate.

3. The catalyst aftertreatment system of claim 2, wherein the heating element is an electrical heating element.

4. The catalyst aftertreatment system of claim 1, further comprising a SCRF subsequent to the mixing chamber unit.

5. The catalyst aftertreatment system of claim 1, further comprising a SCRF preceding the SCR unit.

6. The catalyst aftertreatment system of claim 1, wherein the metal oxide nanoparticle or the metal oxide of the binary catalyst is selected from the group consisting of yttrium oxide, zirconium oxide, vanadium oxide, cerium oxide, manganese oxide, cobalt oxide, iron oxide, and any combination thereof.

7. The catalyst aftertreatment system of claim 1, wherein the zeolite comprises a silicon and aluminum-containing zeolite comprising a maximum pore diameter of less than or equal to 5 angstroms, wherein the zeolite is selected from Fe-doped aluminosilicate zeolites, Cu-doped aluminosilicate zeolites, Fe- and Cu-doped aluminosilicate zeolites, Fe-doped silico-alumino-phosphate zeolites, Cu-doped silico-alumino-phosphate zeolites, and Fe and Cu-doped silico-alumino-phosphate zeolites.

8. The catalyst aftertreatment system of claim 1, wherein the zeolite is a Fe- and/or Cu-doped silico-alumino-phosphate zeolite, and Fe- and/or Cu-doped aluminosilicate zeolite, in combination.

9. The catalyst aftertreatment system of claim 1, wherein the zeolite is selected from SSZ-13 chabazite and aluminosilicate zeolites having SSZ-type zeolite structures.

10. The catalyst aftertreatment system of claim 1, wherein the zeolite comprises a silicon to aluminum ratio (Si/Al) of from 2 to 25.

11. The catalyst aftertreatment system of claim 1, wherein the binary catalyst composition has from 0.05 wt % to 5 wt % of metal oxide when the metal oxide is covalently bound to elements within the crystal lattice of the zeolite.

12. The catalyst aftertreatment system of claim 1, wherein the binary catalyst composition has from 0.5 to 30 wt % of a plurality of metal oxide nanoparticles, when the plurality of metal oxide nanoparticles is hybridized to a zeolite.

13. A method of treating diesel exhaust, comprising:
providing a catalyst aftertreatment system of claim 1;
directing flow of diesel exhaust through the dosing compartment, the mixing chamber, and the selective catalytic reduction (SCR) unit;
introducing, by the doser, the diesel exhaust fluid (DEF) comprising urea into the diesel exhaust;
mixing, by the static metallic mixer and/or the catalyst substrate in the mixing chamber, the DEF with the diesel exhaust, the mixing chamber comprising the static metallic mixer and the catalyst substrate having the binary catalyst coated thereon, wherein the binary catalyst converts at least some of the DEF to $NH_3$, stores $NH_3$, and reduces NOx in the engine exhaust with the $NH_3$ within 60 seconds of a cold start event, with no visible urea deposit formation on the catalyst substrate over a period of at least 40 test runs.

14. The method of claim 13, wherein the mixing chamber further comprises a heating element thermally coupled to the static metallic mixer and/or the catalyst substrate, and heating the static metallic mixer and/or the catalyst substrate to a temperature of from 25° C. to 400° C.

15. The method of claim 13, wherein heating the static metallic mixer and/or the and/or a 1-Liter 300 cpsi binary catalyst-coated substrate comprises electrically heating at a power of from 2 kW to 10 kW.

16. The method of claim 13, wherein heating the static metallic mixer and/or a 10-Liter 300 cpsi binary catalyst-coated substrate comprises electrically heating at a power of from 10 kW to 20 kW.

17. The method of claim 13, comprising converting DEF to $NH_3$ at a temperature lower than the temperature of thermolysis of urea.

18. The method of claim 13, wherein the mixing chamber produces $NH_3$ in an amount of greater than 5.6 g at 80° C.

19. The method of claim 13, wherein the mixing chamber reduces $NO_x$ in an amount of greater than 80% at 80° C.

20. The method of claim 13, wherein upon dosing the diesel exhaust with DEF, the mixing chamber begins converting $NH_3$ within 30 seconds of a cold start.

* * * * *